United States Patent
Vogelsgesang et al.

(10) Patent No.: US 10,901,990 B1
(45) Date of Patent: Jan. 26, 2021

(54) ELIMINATION OF COMMON SUBEXPRESSIONS IN COMPLEX DATABASE QUERIES

(71) Applicant: Tableau Software, Inc., Seattle, WA (US)

(72) Inventors: Adrian Vogelsgesang, Munich (DE); Jan Finis, Munich (DE); Manuel Then, Munich (DE)

(73) Assignee: Tableau Software, Inc., Seattle, WA (US)

( * ) Notice: Subject to any disclaimer, the term of this patent is extended or adjusted under 35 U.S.C. 154(b) by 579 days.

(21) Appl. No.: 15/885,677

(22) Filed: Jan. 31, 2018

Related U.S. Application Data

(60) Provisional application No. 62/527,767, filed on Jun. 30, 2017, provisional application No. 62/528,903, filed on Jul. 5, 2017.

(51) Int. Cl.
*G06F 16/2453* (2019.01)

(52) U.S. Cl.
CPC .... *G06F 16/2454* (2019.01); *G06F 16/24542* (2019.01)

(58) Field of Classification Search
None
See application file for complete search history.

(56) References Cited

U.S. PATENT DOCUMENTS

| | | | |
|---|---|---|---|
| 5,379,422 A | 1/1995 | Antoshenov | |
| 6,275,818 B1 | 8/2001 | Subramanian et al. | |
| 7,574,424 B2 | 8/2009 | Chowdhuri | |
| 8,239,847 B2 | 8/2012 | Yu et al. | |
| 8,898,145 B2 | 11/2014 | Wang et al. | |
| 9,773,041 B2 | 9/2017 | Cruanes | |
| 2003/0120682 A1* | 6/2003 | Bestgen | G06F 16/24526 |
| 2009/0228414 A1 | 9/2009 | Dumeur et al. | |

(Continued)

OTHER PUBLICATIONS

Lehner, et al., Web-Scale Data Management for the Cloud, "Chapter 4: Web-Scale Analytics for BIG Data," Springer Science+Business Media, New York, NY, © 2013, pp. 91-135.

(Continued)

*Primary Examiner* — Aleksandr Kerzhner
*Assistant Examiner* — Eddy Cheung
(74) *Attorney, Agent, or Firm* — Morgan, Lewis & Bockius LLP

(57) ABSTRACT

A database engine receives a human-readable database query that includes a plurality of conditional expressions. The database engine parses the database query to build an operator tree that includes a subtree corresponding to each of the conditional expressions. The database engine identifies a subexpression that appears in two or more of the conditional expressions. The subexpression is executed conditionally. The database engine hoists the subexpression outside of the conditional expression so that it is executed unconditionally. The database engine modifies the operator tree to specify computation of a value for the subexpression a first time and to reuse the computed value when the subexpression is subsequently encountered. The database engine executes the modified operator tree to form a result set corresponding to the database query, thereby evaluating the subexpression only a single time for each row of input data and returns the result set.

20 Claims, 20 Drawing Sheets

(56) References Cited

U.S. PATENT DOCUMENTS

| | | |
|---|---|---|
| 2010/0191720 A1 | 7/2010 | Al-Omari et al. |
| 2011/0137890 A1 | 6/2011 | Bestgen et al. |
| 2011/0313999 A1 | 12/2011 | Bruno et al. |
| 2012/0136850 A1 | 5/2012 | Barsness et al. |
| 2012/0323885 A1* | 12/2012 | Wang .............. G06F 16/24534 707/714 |
| 2013/0091122 A1 | 4/2013 | Salch et al. |
| 2014/0095472 A1 | 4/2014 | Lee et al. |
| 2014/0258266 A1* | 9/2014 | Cruanes .............. G06F 16/2454 707/718 |
| 2016/0350371 A1 | 12/2016 | Das et al. |
| 2017/0031975 A1 | 2/2017 | Mishra et al. |
| 2017/0255674 A1 | 9/2017 | Attaluri et al. |
| 2018/0024922 A1 | 1/2018 | Hassan |
| 2018/0039575 A1* | 2/2018 | De Smet .......... G06F 16/24568 |
| 2018/0089268 A1 | 3/2018 | Lee et al. |
| 2018/0121426 A1 | 5/2018 | Barsness et al. |
| 2018/0157707 A1* | 6/2018 | Lurie .................. G06F 16/2255 |
| 2018/0314733 A1 | 11/2018 | Wen et al. |

OTHER PUBLICATIONS

Schreier, Preinterview First Office Action, U.S. Appl. No. 15/650,658, dated Apr. 29, 2019, 4 pgs.

Schreier, First Action interview Office Action, U.S. Appl. No. 15/650,658, dated Jun. 27, 2019, 4 pgs.

Schreier, Notice of Allowance, U.S. Appl. No. 15/650,658, dated Oct. 10, 2019, 10 pgs.

Schreier, Preinterview First Office Action, U.S. Appl. No. 15/681,294, dated Mar. 6, 2020, 4 pgs.

Schreier, First Action, Preinterview Office Action, U.S. Appl. No. 15/681,294, dated Mar. 31, 2020, 4 pgs.

Vogelsgesang, Notice of Allowance, U.S. Appl. No. 16/231,302, dated Jun. 22, 2020, 9 pgs.

* cited by examiner

```
((if [Hue] >= 0 and [Hue] < 120 then 0
elseif [Hue] >= 120 and [Hue] < 180 then [X calc]
elseif [Hue] >= 180 and [Hue] < 300 then [C]
elseif [Hue] >= 300 and [Hue] < 360 then [X calc]
end)+[m])*255
```

Figure 3A

```
SELECT X, Y, SUM(
    [huge expression of 10.8 Megabyte SQL text]
)
FROM "Extract"
GROUP BY X, Y
```

Figure 3C

```
SELECT a+b, a*b, CASE
    WHEN condition1 THEN a+b+2
    WHEN condition2 THEN a*b-2
    ELSE b
  END,
  a+b+2
FROM table1;
```

(CASE WHEN (a+b)>0 THEN floor(a+b) ELSE b+a END)
+ b / (CASE WHEN (a+b)>0 THEN floor(a+b) ELSE b+a END)

```
CASE
   WHEN a/b > 0 THEN b/c + 2
   ELSE sqrt(c) + 2/a + b/c
END + CASE
   WHEN a/b > 1 THEN b/c + 1
   ELSE 2/a
END
```

Figure 5

```
1  Function TraverseUntilCase(expr, caseCallback, otherCallback):
2      if expr is case expression then
3          descend ← caseCallback(expr);
4          if descend then
5              TraverseUntilCase(
6                  Expr.first condition, caseCallback, otherCallback)
7      else
8          descend ← otherCallback(expr);
9          if descend then
10             foreach child in expr do
11                 TraverseUntilCase(child, caseCallback, otherCallback)
```

Figure 8A

```
1  Function markHoisted(root):
2      TraverseUntilCase(root,
3          λ expr . (
4              hoistFromCase(expr);
5              foreach hoistedExpr ∈ H[expr] do markHoisted(hoistedExpr) ;
6              return true;
7          )
8      );
```

Figure 8C

```
1  Shared state: H: map containing hoisted expressions indexed by target expression 2  Function hoistFromCase(caseExpr):
3  |   exprByBranch ← empty hash map containing lists of expressions;
4  |   unexpandedCases ← empty FIFO queue;
5  |   branches ← getBranches(caseExpr);
6  |   /* Collect expressions from all but the last branch */
7  |   foreach branch in branches except last one do
8  |   |   TraverseUntilCase(branch,
9  |   |     λ expr . (
10 |   |       exprByBranch[branch].add(expr);
11 |   |       unexpandedCases.append((branch,expr));
12 |   |       return true;
13 |   |     )
14 |   |     , λ expr . (exprByBranch[branch].add(expr),true)
15 |   |   );
16 |   /* Helper lambdas for hoisting */
17 |   hoist ← λ candidateExpr . (
18 |   |   if ∀b ∈ branches . candidateExpr ∈ exprByBranch[b] then
19 |   |     H[caseExpr] ← H[caseExpr] ∪ {candidateExpr};
20 |   |     return true;
21 |   |   else return false ;
22 |   )
23 |   hoistFromTree ← λ treeRoot,branch . (
24 |   |   TraverseUntilCase(treeRoot,
25 |   |     λ expr . (
26 |   |       exprByBranch[branch].add(expr);
27 |   |       unexpandedCases.append(branch,expr);
28 |   |       return not hoist(expr);
29 |   |     )
30 |   |     , λ expr . (
31 |   |       exprByBranch[branch].add(expr);
32 |   |       return not hoist(expr);
33 |   |     )
34 |   |   );
35 |   )
36 |   /* Traverse the last branch & hoist common expressions */
37 |   hoistFromTree(branches.back(),branches.back());
38 |   /* Recurse into unexpanded Case expressions */
39 |   foreach (branch,expr) ∈ unexpandedCases do
40 |   |   if expr ∈ H[caseExpr] then continue;
41 |   |   hoistFromCase(expr);
42 |   |   foreach hoistedExpr ∈ H[expr] do
43 |   |     hoistFromTree(hoistedExpr,branch);
```

Figure 8B

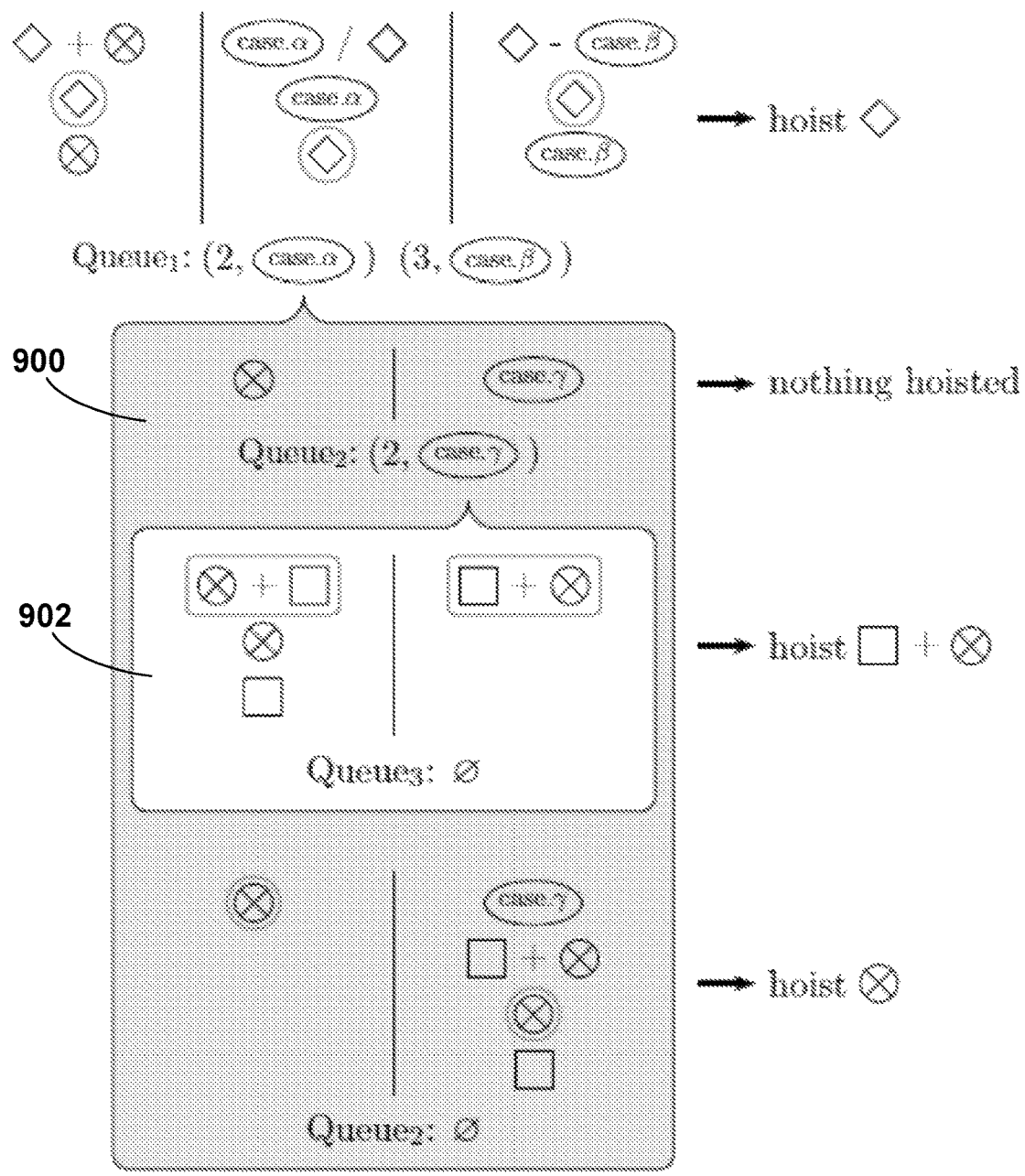
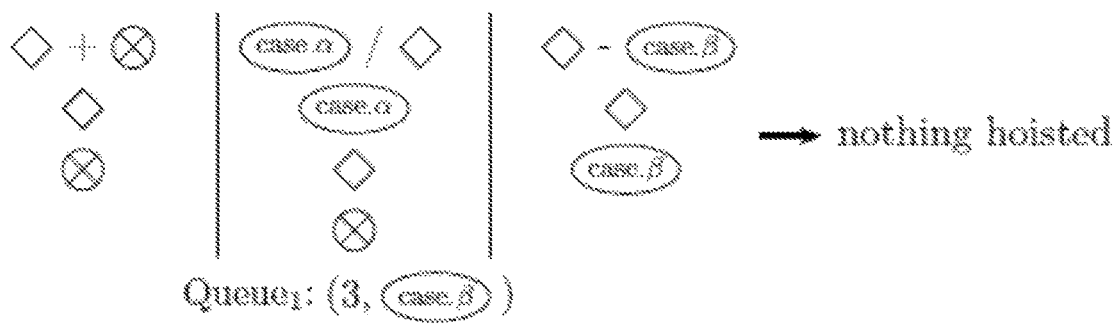
Figure 9A

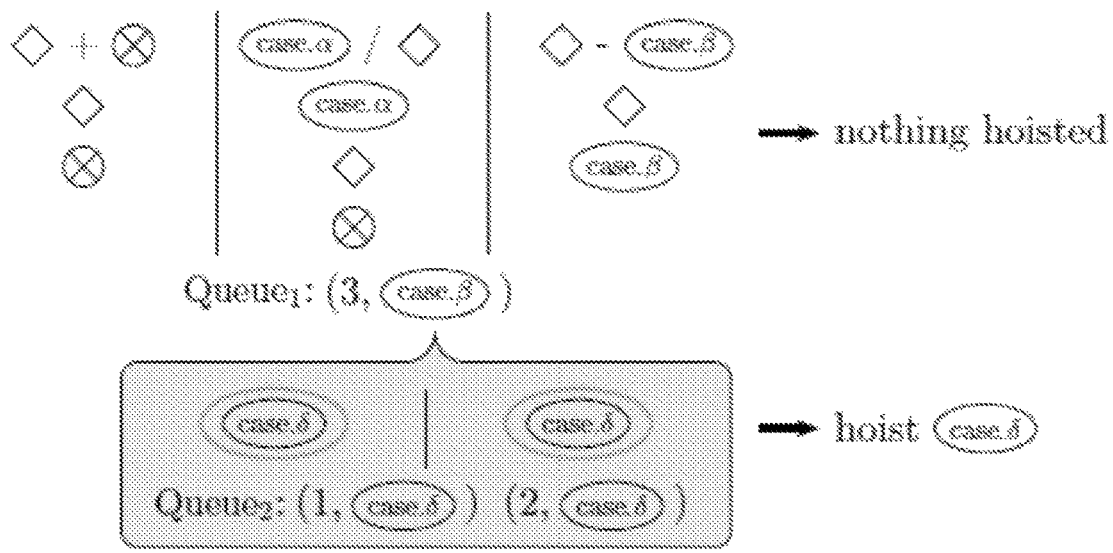
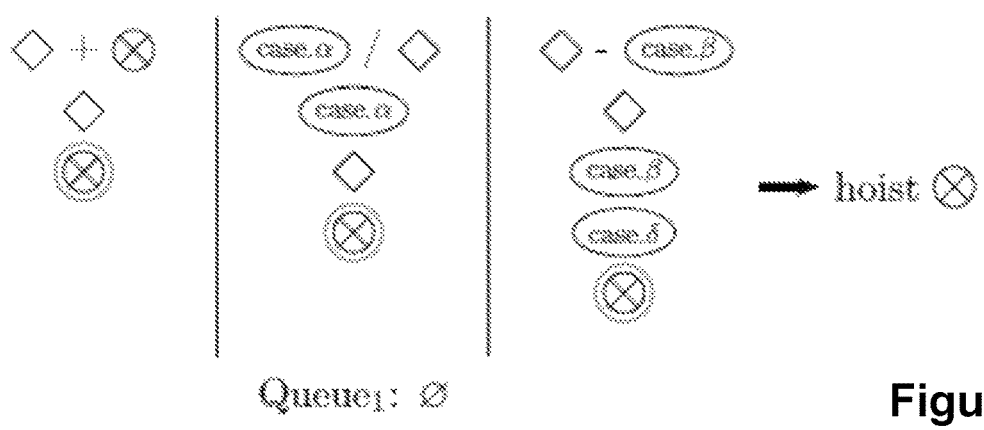
Figure 9B

ELIMINATION OF COMMON SUBEXPRESSIONS IN COMPLEX DATABASE QUERIES

RELATED APPLICATIONS

This application claims priority to U.S. Provisional Application Ser. No. 62/527,767, filed on Jun. 30, 2017, entitled "Elimination of Common Subexpressions in Complex Database Queries," and U.S. Provisional Application Ser. No. 62/528,903, filed on Jul. 5, 2017, entitled "Elimination of Common Subexpressions in Complex Database Queries," each of which is incorporated by reference herein in its entirety.

TECHNICAL FIELD

The disclosed implementations relate generally to relational database systems, and more specifically to system features that improve query execution performance.

BACKGROUND

A database engine receives queries, and retrieves data from one or more database tables to provide the data requested by the query. A database query is expressed in a specific query language, such as SQL. In general, a database query specifies the desired data without specifying a detailed execution plan about how to retrieve the data. For example, in SQL, the query includes a SELECT clause, a FROM clause, and a WHERE clause, which specify the data columns desired, the tables that include the desired columns, and conditions on how the data is selected. SQL queries may also contain a GROUP By clause, a HAVING clause, and/or an ORDER BY clause. It is up to the database engine to parse each query, build an execution plan, and execute the plan to retrieve the requested results. This gives the database engine substantial flexibility. However, different execution plans for the same query can have enormously different execution times to retrieve the results. For example, one execution plan may retrieve the results in less than a second, whereas a second plan may take hours to retrieve exactly the same results. To address this issue, database engines typically include one or more optimization layers to improve execution performance. Unfortunately, existing database engines have difficulty optimizing certain types of complex queries.

SUMMARY

When an SQL query is received by a database engine, the query is parsed and translated into an abstract syntax tree. Semantic analysis turns the syntax tree into an operator tree. Building the operator tree combines the syntax tree with schema information, resolves table and column names, and resolves internal references within the query. During logical optimization the database engine applies constant folding, predicate pushdown, and join reordering, as well as other optimization techniques. The database engine described herein is able to unnest correlated subqueries, and thereby avoids nested loop joins used by other databases engines (which have $O(n^2)$ execution time). Some database engines choose access paths as part of the logical optimization. The existence of an index on a joined column can enable the usage of index-nested loop joins and thereby influences the optimality of different join orders. Because of this, access paths are typically chosen as part of join reordering. Next, the database engine chooses a physical implementation for each of the algebraic operators in the operator tree. In some implementations, during this phase, the database engine also chooses the appropriate access path and indices to retrieve the requested data as fast as possible. The optimized operator tree is compiled to LLVM intermediate representation (IR) code. The IR code is passed to an LLVM compiler, which compiles the intermediate representation to native machine code. This compiled code is then loaded and linked with the database engine at runtime and executed. The database engine is essentially an optimizing JIT compiler for SQL queries.

In order to enable efficient code generation, implementations use a produce-consume execution model. In this execution model, the code for all operators is fused together, enabling the system to push one tuple at a time through the whole operator tree up to the next pipeline breaker.

In some implementations, the database engine uses "Morsel-driven parallelism." In this parallelization model, work is dynamically balanced between worker threads. Tuples are handed out to the worker threads in so-called morsels, which are chunks of a few thousand tuples. Worker threads take thread-locality into account when picking up morsels for processing.

In some implementations, the database engine uses Low Level Virtual Machine (LLVM) as an intermediate representation before generating native machine code. LLVM provides an extensible and reusable compiler framework. It is centered around a platform-agnostic intermediate representation (IR). LLVM IR represents a program in a low-level assembly-like language on an infinite-register machine. Because it is built to allow efficiently applying code optimizations, the IR is represented in static single assignment (SSA) form. Similar to some functional languages, programs in SSA form can assign each register only once. Thanks to this restriction, optimization passes can be implemented more efficiently and do not need to track the lifetimes of register assignments. Instructions are contained in basic blocks. Basic blocks represent a contiguous block of instructions that is not interrupted by either outgoing or incoming jumps. One or more basic blocks form a function.

LLVM provides an API, which enables building code in this IR format. The API offers a variety of optimization passes operating on the IR format. In addition, the optimized IR code (or unoptimized IR code) can be compiled to native machine code. The database engine leverages the infrastructure provided by LLVM in order to directly load the generated code into its own process. As soon as the code is compiled and loaded using LLVM, the database engine can call the compiled functions just like other C++ functions.

The database engine's optimizer and query engine are decoupled from the storage layer. This enables the database engine to work on a large set of different storage formats.

In some implementations, the data is stored in blocks, and may be stored in a columnar format. In addition to the actual data, each block contains a small materialized aggregate (SMA). This aggregate contains the minimum and maximum of all values contained in the current block. Using the SMAs, the database engine is able to evaluate restrictions on whole blocks at once during table scans. One can infer from the minimum and maximum values when the condition cannot be satisfied, so the whole block is skipped. On the other hand, the comparison can also show that the restriction is a tautology for the tuples contained in the current data block. In this case, the evaluation of the restriction on each individual block can be omitted. Furthermore, each column contains a so-called Positional SMA (PSMA). PSMAs enable further narrowing down the range within a Data Block that contains tuples that potentially satisfy the restriction.

A method is provided for enhancing real-time data exploration through Common Subexpression Elimination (CSE) and Common Subexpression Hoisting (CSH) techniques. In CSE, an expression appears two or more times in a query, and the database engine optimizes the execution by calculating a value for the expression only once (per tuple). The result of the calculation is saved and then reused as needed. CSH is similar, but applies when one or more of the expressions is executed conditionally. CSH is a helper technique, which enables the database engine to apply CSE in more cases. CSH reorders the execution of some calculations and thereby allows more aggressive application of CSE. In particular, when the database engine does not know which expressions will be evaluated, CSE is not directly applicable. To address this, an expression is hoisted outside of a conditional statement and executed unconditionally. In this situation, the value of the unconditional execution can be reused to replace all of the other conditional instances of the expression. By hoisting the expression, the process essentially makes the expression suitable for CSE.

In accordance with some implementations, a method is performed at a database engine having one or more computing devices, each having one or more processors and memory. The memory stores one or more programs configured for execution by the one or more processors. The one or more programs execute to retrieve data from a database (e.g., an SQL database). The database engine receives a human-readable database query that includes a plurality of conditional expressions. The database engine parses the database query to build an operator tree that includes a subtree corresponding to each of the conditional expressions. The database engine identifies a subexpression that appears in two or more of the conditional expressions. The subexpression is executed conditionally. The database engine hoists the subexpression outside of the conditional expression so that it is executed unconditionally. The database engine modifies the operator tree to specify computation of a value for the subexpression a first time and to reuse the computed value when the subexpression is subsequently encountered. The database engine executes the modified operator tree to form a result set corresponding to the database query, thereby evaluating the subexpression only a single time for each row of input data and returns the result set.

In some implementations, the database engine maps the subexpression to an LLVM register. In some cases, the LLVM compiler map the LLVM register to a CPU register. In this case, for each row of input data, the database engine computes a respective value for the subexpression a first time, stores the respective value in the CPU register, and retrieves the respective value from the CPU register when data for the subexpression is needed a second time.

In some implementations, the database engine determines that a second subexpression is equivalent to the subexpression. The database engine further modifies the operator tree to reuse the computed value when the second subexpression is subsequently encountered. In some implementations, executing the modified operator tree comprises reusing the computed value for the subexpression as a value for the second subexpression.

In some implementations, determining that the second subexpression and the subexpression are equivalent comprises using an equivalence function to recursively check that the subexpression and the second subexpression apply the same operation on the same set of input arguments. In some implementations, the equivalence function accounts for equivalence of operations that are associative and/or commutative.

In some instances, the subexpression is nested inside of a conditional expression. In some implementations, hoisting the subexpression outside of the conditional expression comprises caching the subexpression to an outer consumer context, thereby making the subexpression available for reuse. During code generation, the database engine uses a context referred to as a "ConsumerContext" to keep track of the currently available calculation results. For this purpose, the ConsumerContext maintains a mapping from each calculation to the corresponding LLVM register that stores the corresponding calculation result.

In some implementations, the operator tree has a plurality of alternative branches. In some implementations, the hoisting is performed in accordance with a determination that the subexpression will be computed no matter which alternative branch of the plurality of alternative branches is executed during execution of the operator tree. In some implementations, the hoisting is performed in accordance with a determination that the subexpression is accessed for at least a plurality of the alternative branches.

In some implementations, executing the operator tree comprises compiling the operator tree to form machine code and executing the machine code. In some implementations, machine code generated for the modified operator tree has fewer instructions than machine code generated for the operator tree built from parsing the database query.

Thus methods, systems, and computer readable media are disclosed that provide more efficient processing by hoisting a subexpression outside of a conditional expression and reusing a computed value for subsequent equivalent subexpressions.

Both the foregoing general description and the following detailed description are exemplary and explanatory and are intended to provide further explanation of the invention as claimed.

BRIEF DESCRIPTION OF THE DRAWINGS

For a better understanding of the aforementioned systems and methods that provide efficient database query processing, reference should be made to the Description of Implementations below, in conjunction with the following drawings in which like reference numerals refer to corresponding parts throughout the figures.

FIGS. 3A and 3B illustrate an example of a calculation that includes a conditional expression and a visualization of dependencies among calculations, a subset of which is used to compute the expression in FIG. 3A, in accordance with some implementations.

FIG. 3C illustrates an example of a query generated based on the calculations shown in FIG. 3B.

FIG. 5 is an expression that hoisting may apply to, in accordance with some implementations.

FIGS. 8A-8C provide pseudocode for a plurality of functions that may be applied for eliminating common subexpressions, in accordance with some implementations.

FIGS. 9A and 9B illustrate a trace showing the states and recursion levels of a function according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

Description of Implementations

Figure 1:
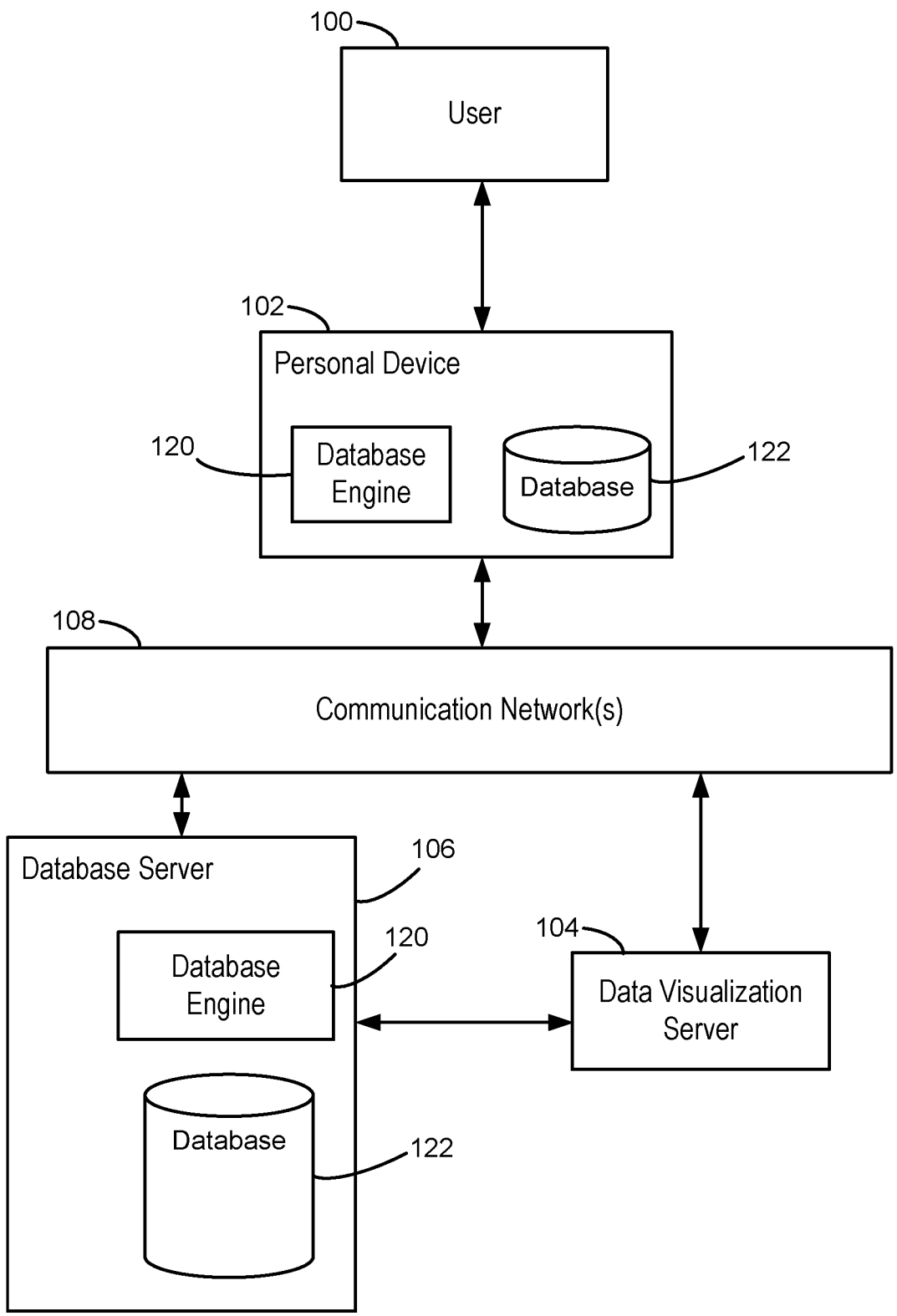
FIG. 1 illustrates the context for a database system in accordance with some implementations.

FIG. 1 illustrates a context in which some implementations operate. A user 100 interacts with a personal device 102, such as a desktop computer, a laptop computer, a tablet computer, or a mobile computing device. A personal device 102 is an example of a computing device 200. The term "computing device" also includes server computers, which may be significantly more powerful than a personal device used by a single user, and are generally accessed by a user only indirectly. An example computing device 200 is described below with respect to FIG. 2, including various software programs or modules that execute on the device 200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). In some implementations, the personal device includes a data visualization application 222, which the user 100 uses to create data visualizations from the desktop data sources 224 and/or the relational databases 122. In this way, some implementations enable a user to visualize data that is stored locally on the personal device 102.

In some cases, the personal device 102 connects over one or more communications networks 108 to one or more external database servers 106 and/or a data visualization server 104. The communication networks 108 may include local area networks and/or wide area networks, such as the Internet. In some implementations, the data visualization server 104 provides a data visualization web application that runs within a web browser 220 on the personal device 102. In some implementations, data visualization functionality is provided by both a local application 222 and certain functions provided by the data visualization server 104. For example, the data visualization server 104 may be used for resource intensive operations. In some implementations, the one or more database servers 106 include a database engine 120, which provides access to one or more databases 122 that are stored at the database server 106. As illustrated in FIG. 1, a database engine 120 and corresponding databases 122 may reside on either a local personal device 102 or on a database server 106. In some implementations (not illustrated here), the data visualization server 104 includes a database engine 120 and one or more databases 122.

Figure 2:
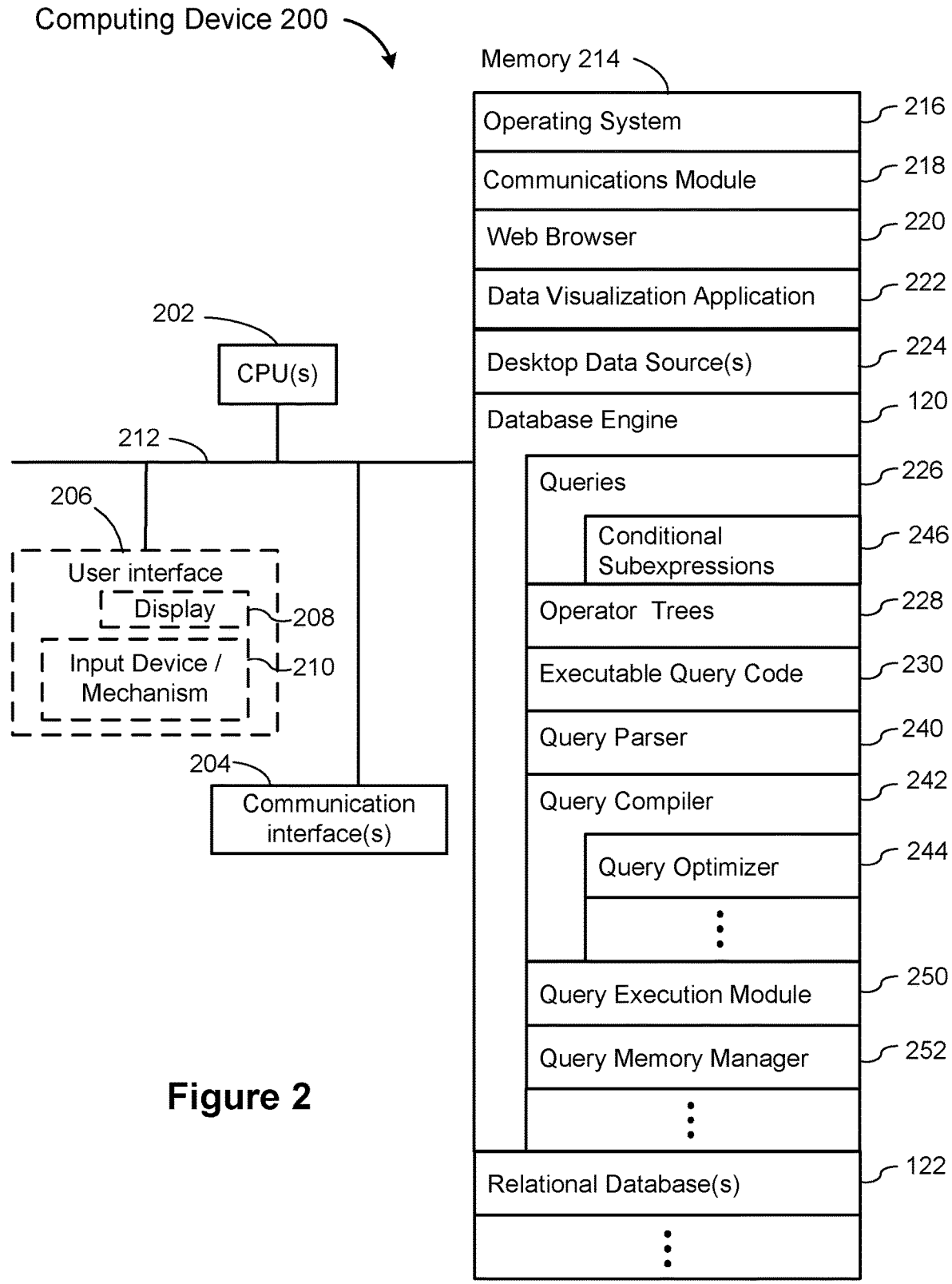
FIG. 2 is a block diagram of a computing device according to some implementations.

FIG. 2 is a block diagram illustrating a computing device 200 in accordance with some implementations. As used herein, the term "computing device" includes both personal devices 102 and servers, such as a database server 106 or a data visualization server 104. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 may include a user interface 206 comprising a display device 208 and one or more input devices or mechanisms 210. In some implementations, the input device/mechanism 210 includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPU(s) 202. The memory 214, or alternatively the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server 104. In some implementations, a data visualization web application (not shown) is an alternative to storing a data visualization application 222 locally;

- a data visualization application 222, which enables users to construct data visualizations from various data sources. The data visualization application 222 retrieves data from one or more data sources, such as a desktop data source 224 (e.g., a CSV file or flat file), a relational database 122 stored locally, or a desktop data source or relational database 122 stored on another device (such as a database server 106). The data visualization application then generates and displays the retrieved information in one or more data visualizations;
- one or more desktop data sources 224, which have data that may be used and displayed by the data visualization application 222. Data sources 224 can be formatted in many different ways, such as spreadsheets, XML files, flat files, CSV files, text files, JSON files, or desktop database files. Typically, the desktop data sources 224 are used by other applications as well (e.g., a spreadsheet application);
- a database engine 120, which receives database queries 226 (e.g., a query from a data visualization application) and returns corresponding data. The database engine 120 typically includes a plurality of executable modules;
- the database engine 120 invokes a query parser 240, which parses each received query 226 (e.g., SQL database query) to form an operator tree 228. An operator tree is sometimes referred to as an expression tree or an algebra tree. In some implementations, the query parser 240 is contained within the query compiler 242;
- the database engine 120 includes a query compiler 242, which translates each operator tree 228 into executable code 230. For brevity, the query compiler 242 is also referred to as the compiler. In some implementations, the compiler 242 includes an optimizer 244, which modifies an operator tree 228 to produce a (theoretically) more efficient execution plan. The optimizer is generally capable of identifying multiple types of optimization based on the structure of the operator tree and the data requested. Some implementations identify when to hoist subexpressions, such as a conditional subexpression 246, outside of a conditional expression. When the executable code is executed, a value is computed and saved for the hoisted expression, and the saved value is used when the subexpression is subsequently encountered. In this way, the subexpression is computed once for each row, and that computed value is reused when the same subexpression is encountered again. In some instances, the computed value is stored in a register of the CPU(s) 202;
- the database engine 120 includes a query execution module 250, which executes the code 230 generated by the query compiler 242; and
- the database engine 120 also includes a query memory manager 252, which tracks memory utilization by each of the processes, and dynamically allocates memory as needed. In some implementations, the memory manager 252 detects when there is insufficient memory while executing the compiled code. In some implementations, the query memory manager 252 communicates with the query execution module 250.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Standard relational database query engines rely on relational algebra trees (e.g., an operator tree 228) for evaluating logically optimized plans. A typical algebra tree 228 has the nice property that its leaves correspond to base relations and each node in the tree 228 can be evaluated based solely on nodes of its subtree. To evaluate a node in the tree, a typical "iterator engine" works by pulling intermediate results from the subtrees corresponding to children of the node.

Figure 3B:
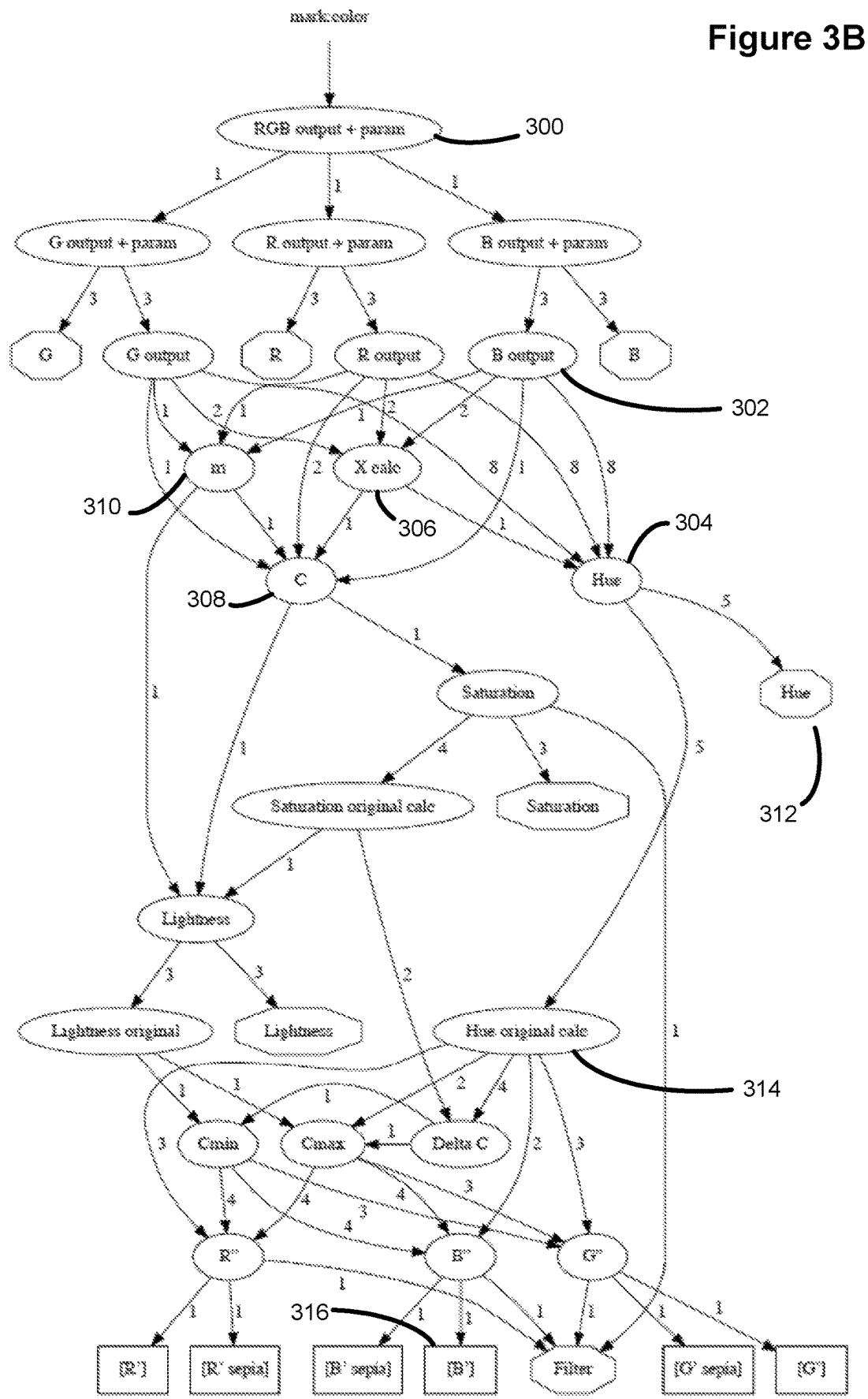

FIG. 3A provides an example of a calculation that includes conditional expressions. This is an unusual example, but it emphasizes the value of eliminating common subexpressions. The calculation in FIG. 3A is one example of a plurality of calculations that may be used to produce color in an image workbook (e.g., to transform colors in an edited image from HSL to RGB). The calculation in FIG. 3A determines the output for a single color (e.g., blue may be represented by "B output" 302, as shown in FIG. 3B). The calculation shown in FIG. 3A contains 12 references to 4 different calculations, including eight references to [Hue] 304, two references to [X calc] 306, one reference to [C] 308 and one reference to [m] 310. Further, each of the calculations shown in FIG. 3A depends on a plurality of other calculations, as shown in FIG. 3B.

FIG. 3B provides a complex dependency graph for a plurality of calculations that are used for computing the color of a table cell in an image. In FIG. 3B, each calculation node is depicted as an ellipse, each parameter node is depicted as an octagon, and each column from an underlying database table is depicted as a rectangle. The numbers next to the edges indicate how many times a graph element references another graph element.

As illustrated in FIG. 3B, some calculations are referenced multiple times. For example, the B output calculation 302 references [Hue] 304 eight times, as indicated by the number 8 on the line between "B output" and "Hue" in FIG. 3B. The calculation [Hue] 304 in turn references the Hue parameter 312 and the calculation "Hue original calc" 314 five times each.

These calculations from the data visualization application 222 may be pushed down to the underlying database by converting them from the original calculation language to SQL. For example, a calculation with references to other calculations are resolved by expanding the whole referenced calculation inline in SQL. However, these generated SQL queries can get huge. For example, when transforming the B output calculation formula shown in FIG. 3A to SQL, the whole subtree for Hue 304 gets inlined in 8 different places.

The SQL expression for Hue 304 in turn contains 5 copies of the Hue original calc 314 which in turn contains 2 copies of B".

The number of inlined duplicates of a calculation at a node X, contained in another calculation at a node Y, is the sum of the products of all edge labels over all paths from Y to X. For example, the expanded SQL expression for the Hue calculation 304 contains a total of (5·2·4·1)+(5·4·1·4·1)+(5·2·1)=130 inlined references to the column [B'] 316.

By building this sum over all paths from [RGB output+param] 300 to [B'] 316, [B'] is inlined 26,292 times in the top-level calculation used by this workbook. All in all, there are 146,856 inlined references to base columns throughout this dependency graph.

The overall structure of a final generated query as received by a database engine is shown in FIG. 3C. In this example, the query is not optimal. The fields X and Y are primary keys, so the aggregation has no effect. This query is structurally simple, but the sheer size of the expression is enormous.

Although FIGS. 3A-3C illustrate an extreme case, there are many less extreme cases where eliminating common subexpressions can substantially improve performance.

In some implementations, a database engine implements common subexpression elimination (CSE). In some implementations, a database engine introduces additional map operators for duplicated expressions and reuses the result of this map operator each time the expression occurs. In this way, each equivalent expression is evaluated only once.

Calculations can reference the underlying data, the user supplied parameters, and other calculations, as illustrated in FIG. 3B. In some instances, the calculations entered by users are fairly simple, so they do not pose a significant challenge for a database engine. However, calculations can get problematic when they are nested (e.g., when calculations depend on other calculations).

In some implementations, the compiler 242 (or the optimizer 244) supports elimination of redundant computations. For example, LLVM implements global value numbering (GVN) and GVN-Hoist optimization passes. In some implementations, the database engine uses LLVM for compilation and some optimizations.

In some implementations, during code generation, the database engine goes over all expressions in the optimized expression tree in a depth first traversal, generating the code for the expressions in a post-order sequence. While doing so, the database engine keeps a mapping between derived expressions and corresponding LLVM registers that store the results for the expressions. As each expression is encountered, the expression is checked against the mapping. If the expression is already mapped, the generated code just reads the corresponding register and the depth-first traversal for this expression is pruned. Otherwise a new mapping entry is created and LLVM code is generated to compute a value for the expression. In some instances, the compiled machine code corresponding to this LLVM code stores the value for the expression in a CPU register, as described in step 628 of FIG. 6. Later references to the same expression read from the register.

To reuse expressions stored in CPU registers requires identifying the context in which it can be used. This is similar to tracking the scope of a variable in ordinary programming languages. In some implementations, the database engine uses the concept of a ConsumerContext. A consumer context encapsulates the tracking of expressions that are currently available in registers. The lifetime of a ConsumerContext is chosen so that it contains only cached expressions that are correctly dominated while still allowing as much reuse as possible of expression results that are already calculated. In some implementations, this means that at most one ConsumerContext per basic block is required. In some implementations, a ConsumerContext can span multiple basic blocks when the currently generated basic block is dominated by all basic blocks that previously cached expression results in the same ConsumerContext.

In some instances, a ConsumerContext has a parent. When checking if the result of a given expression is already available, all parents are searched for a cached value for the expression in addition to the current ConsumerContext. A nested ConsumerContext thereby allows reusing values from its parent contexts without adding newly derived values to it.

Figures 4A, 4B:
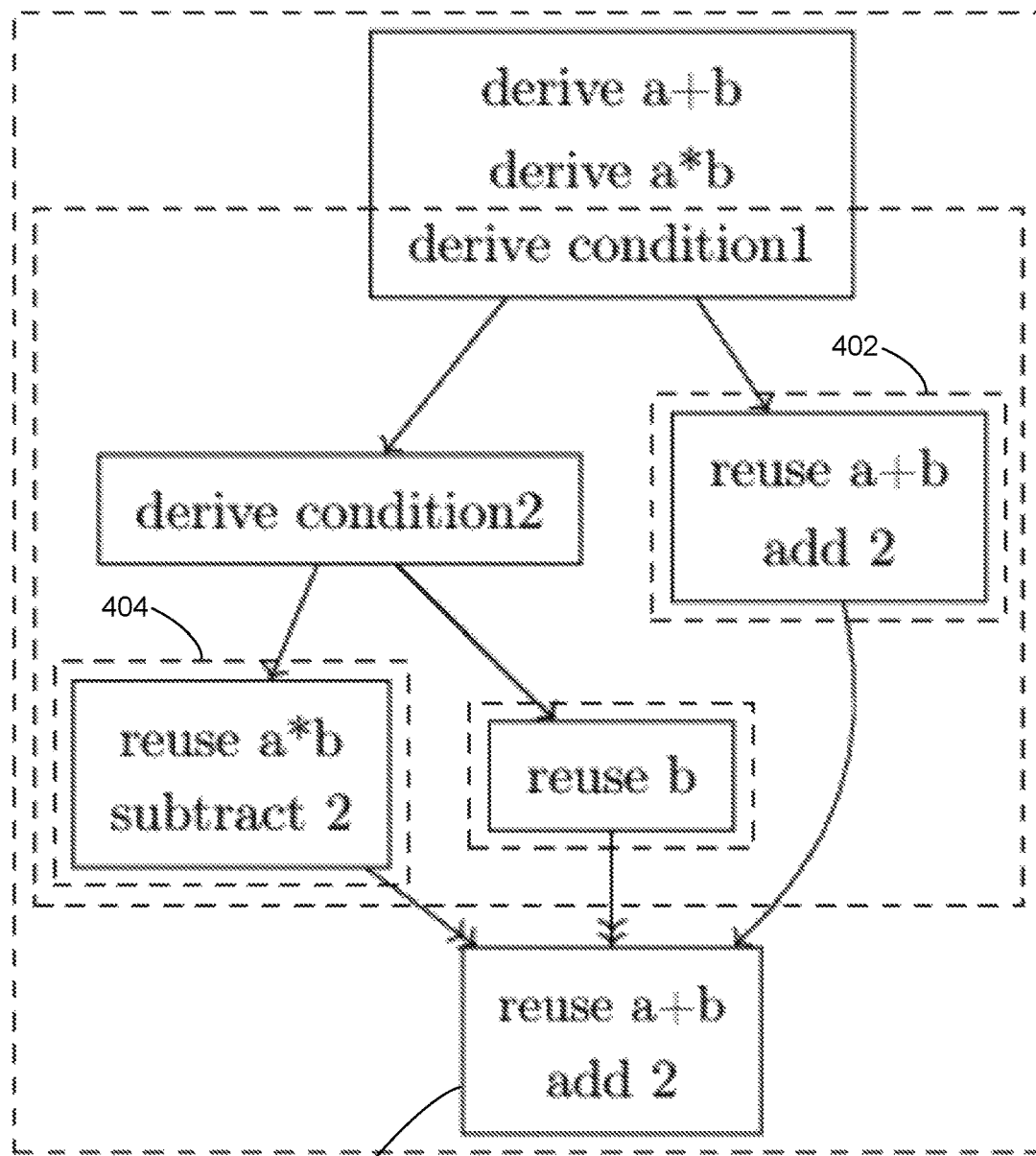
FIG. 4A illustrates an exemplary database calculation that includes a conditional subexpression, in accordance with some implementations.
FIG. 4B illustrates basic blocks and a control flow representing the database calculation in FIG. 4A, in accordance with some implementations.

FIG. 4B illustrates basic blocks and ConsumerContexts for the expression shown in FIG. 4A. FIG. 4B shows the structure of the LLVM code generated for the expressions and does not include the surrounding code (e.g., the loop over all tuples). Basic blocks are depicted as solid boxes and the control flow is depicted by the arcs between them. The ConsumerContexts used while generating the code are depicted as dashed boxes. Parent relationships between ConsumerContexts are depicted by containment.

In the example shown in FIG. 4B, the first two value expressions from the select list do not branch and are derived in the same basic block. The CASE expression, however, requires branching and hence requires a nested ConsumerContext. First, condition1 is derived in this nested context. Note how the ConsumerContext is changed within the same basic block. In some implementations, there is no need to start a new basic block when using a new ConsumerContext. Depending on the value of conditional, the next branch either goes to a basic block computing the value of the corresponding THEN clause or goes on to evaluate the next condition. The corresponding value a+b+2 is derived in a new nested context 402 because results calculated during its evaluation cannot be reused for the evaluation of condition2. For the same reason the expressions a*b-2 and b are evaluated in separate nested contexts. The last value expression a+b+2 is evaluated in the top-level context because it does not depend on any of the conditions.

Given this nesting of contexts, the database engine is able to reuse the result of the calculation a+b (from the first value expression) for deriving the value of a+b+2 in the first nested context 402 and the final basic block 406. The expression a+b+2 is contained in both the third and fourth value expression of the SELECT. In some instances, the database engine reuses the result of a*b from the top-level block when evaluating the expression a*b-2 in the nested context 404. Although the same expression a+b+2 appears in both the nested context 402 (inside the CASE expression) and the final basic block 406, the first evaluation cannot be reused. Reusing it would violate the requirement of the SSA representation of LLVM code that all uses of a variable must be dominated by the corresponding definition. For example, within the query, getting to the fourth value expression, it is unknown which branch was taken and whether the expression a+b+2 was actually evaluated as part of the CASE expression. Some implementations reorder the evaluation of the fourth value expression in the final block 406 before the third expression in the nested context 402 so that the calculation can be reused in the nested context 402.

Some implementations use a special equivalence function and ConsumerContext to determine when two expressions are equivalent. The comparison determines whether both expressions apply the same expression type to the same input arguments. In some implementations, this check handles only binary and unary expressions such as the unary minus, addition, and functions like LOWER. In these implementations, two n-ary expression such as CASE expressions are always considered to be non-equivalent. The expression types are checked for equality by comparing enum values that identify them uniquely. The input arguments to the expression are compared by checking for pointer equality on the underlying LLVM value. In some implementations, in order to speed up the check when an expression already exists in the cache of the ConsumerContext, the comparison uses a hash map indexed by operation type and a pointer for each of the compared expressions.

Figures 4C, 4D:
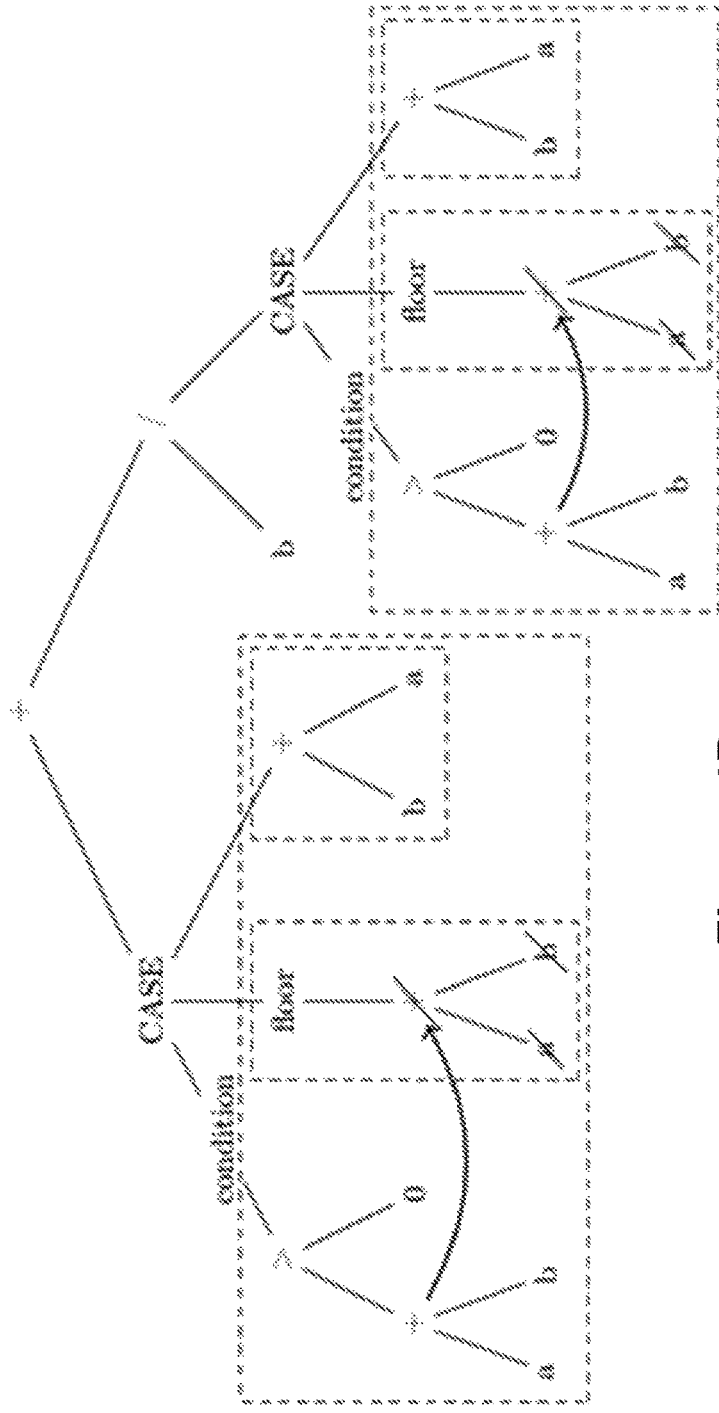
FIGS. 4C and 4D illustrate an exemplary database query and an expression tree representation of the query after applying elimination techniques to the calculation in FIG. 4A, in accordance with some implementations.

FIG. 4C provides an expression that could be used in a database query, and the expression has two CASE expressions. FIG. 4D provides an operator tree corresponding to the expression in FIG. 4C.

The markup in FIG. 4D illustrates applying simple common subexpression elimination by a database engine. Eliminated expressions are struck out and the bold arc lines indicate which expressions replace them. ConsumerContexts are represented by dashed boxes. Common subexpression elimination allows the database engine to de-duplicate some expression subtrees.

In the example shown in FIGS. 4C and 4D, the expression contains considerable redundancy. However, the only reused subexpression is a+b, and even this expression is executed twice because there are two distinct ConsumerContexts. Some implementations eliminate common subexpressions more aggressively, including:

- The calculation for the subexpression a+b from the first CASE statement can be reused in the second CASE statement. Because it is guaranteed that the condition of the first CASE statement will already be evaluated when the second CASE statement is evaluated, the result for a+b from the first CASE statement can be reused within the second CASE statement.
- The subexpression (a+b)>0 can be shared between the two CASE statements because it is always evaluated in the first CASE statement.
- The subexpression floor(a+b) in the second CASE statement can be reused from the same expression in the first CASE statement. Even though this expression is executed conditionally, both of the CASE statements have the same condition. Therefore, every time the second floor(a+b) is computed, the first instance of this expression has necessarily been computed.
- The subexpression b+a is equivalent to a+b because these expressions are commutative. In order to reuse this expression, the equivalence function must be aware of which operations are commutative. The same analysis applies to operations that are associative.
- The entire second CASE statement is completely identical to the first CASE statement, so regardless of the internal complexity of the CASE statement, the two instances are equivalent. To take advantage of this, implementations must handle more than binary and unary expressions. In particular, a CASE statement is an n-ary expression. Because the equivalence function builds on the recursive equivalence of all inputs, handling CASE statements also enables identification of more complex equivalent expressions.

In some implementations, these specific optimizations are sufficient to handle most real-world cases of duplicated expressions in database queries. Some of these optimizations are more useful than others, and depend on the prevalence within specific contexts. For example, the reuse of floor(a+b) from the first CASE statement in the second CASE statement is not a type of optimization that is commonly possible, so the overhead of checking for this optimization for every query may exceed its potential benefit.

In some implementations, the database engine uses the ConsumerContext concept in query clauses other than SELECT clauses. ConsumerContexts are used for all parts of a query that permit expressions, such as WHERE clauses and GROUP BY clauses. In some instances, a single ConsumerContext hierarchy is shared within an entire execution pipeline. In this way, it is possible to reuse subexpressions from one clause (e.g., a WHERE clause) during the evaluation of another clause (e.g., a GROUP BY clause). In some implementations, these improvements in the capability of the database engine to detect and reuse redundant subexpressions also improves the generated code. The improvements occur both locally for a single expression evaluation and globally for better elimination of common subexpression across different query operators.

In some implementations, the way the ConsumerContext hierarchy is built directly influences how much duplication can be removed during code generation. In the previous example of FIGS. 4C and 4D, the expressions a+b and (a+b)>0 appearing in the second CASE statement could not reuse these expressions from the first CASE statement. From a purely logical point of view, there is nothing that would prevent reusing them from the first CASE statement. Both expressions will always be computed by the first CASE statement before the second CASE statement is computed. The basic blocks are created in such a way that the evaluation of the first condition always dominates the basic block immediately following the evaluation of the CASE expression (compare FIG. 4A-4B), so proper nesting of the ConsumerContexts can enable reuse.

In some implementations, nested consumer contexts are created only by query expression that involve conditional evaluation of at least one input. For example, in a CASE statement, an argument (such as floor(a+b) in FIG. 4C) is only evaluated if the condition guarding it evaluates to true. Similarly, a COALESCE statement evaluates its second input only when the first input evaluates to NULL. However, some statements, such as NULLIF, LEAST, and GREATEST, do not create nested consumer contexts. They do not need nested consumer contexts because each of these statements evaluates all of its inputs and does not short-circuit the evaluation.

Having consumer contexts that align with the boundaries of basic blocks is helpful for expression reuse. In general, a consumer context that does not align with the start or end of a basic block indicates that the consumer contexts are not nested perfectly.

Some implementations are able to reuse more expressions by hoisting the first condition of a CASE statement to the outer consumer context. By evaluating this condition in the outer context, the condition itself and all of its subexpressions become available for reuse by expressions that are evaluated in the outer context later on. For example, in an expression of the form "CASE WHEN cond1 THEN val1 WHEN cond2 THEN val2 . . . " the expression cond1 is hoisted. In some implementations, other values and conditions are not hoisted because there is no certainty that they will be actually computed during query execution. For an expression of the form "CASE val WHEN expected1 THEN val1 WHEN expected2 THEN val2 . . . " both val and expected1 can be hoisted. In some implementations, the other expressions (such as val 1 and expected2) cannot be hoisted safely. On the other hand, for the expression COALESCE (v1, v2, . . . ), the expression v1 is evaluated under all circumstances, so it can be hoisted.

Figure 4E:
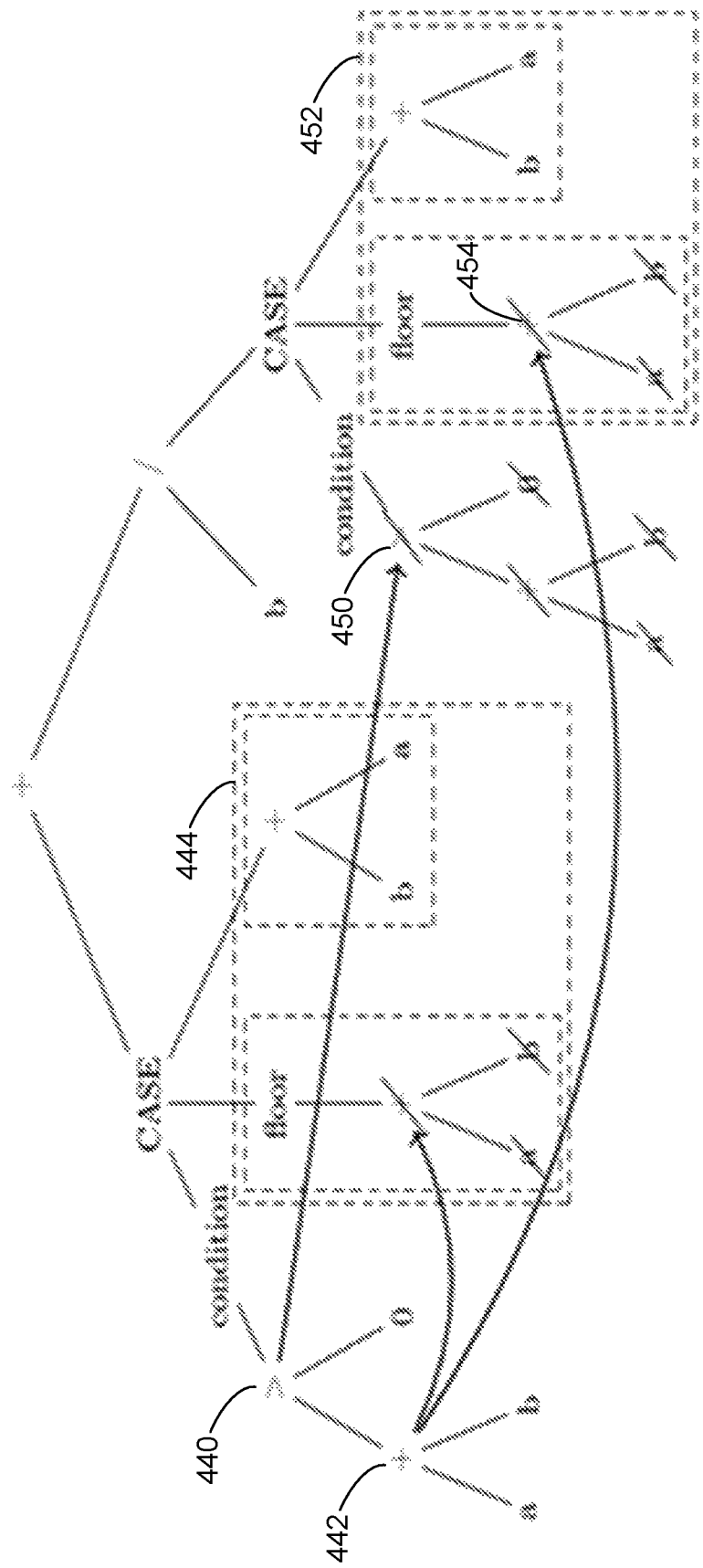
FIG. 4E illustrates an expression tree representation of the database query in FIG. 4C after applying hoisting techniques, in accordance with some implementations.

FIG. 4E shows the same operator tree as in FIG. 4D (based on the expression in FIG. 4C), after hoisting has been applied. The hoisting applies to the expressions within the first condition of the CASE statement, and places them in the outer consumer context. Here, the expression (a+b)>0 (labeled 440) and the expression a+b (labeled 442) are outside of the first nested context 444. The nested consumer context 444 still contains both floor (a+b) and b+a. Because of the hoisting, the expression (a+b)>0 (labeled 450) in the second CASE statement can reuse the same expression 440 from the first CASE statement. The expression 450 reuses the earlier expression 440. In addition, the nested expression a+b (labeled 454) is able to reuse the same expression 442 because of the hoisting. Note that the expression 454 is within the local nested consumer context 452, whereas the expression 450 is outside of the local nested consumer context 452. Both of the expressions are able to reuse a corresponding expression that is computed at the top-level (or higher-level) consumer context.

In some instances, this nested consumer context is empty. In some implementations, for a CASE statement with more than one condition, each condition except the first condition is evaluated in this context (see FIG. 4B).

For example, consider the calculation from FIG. 3A, which references [Hue] in the first "if" condition. As depicted in FIG. 3B, Hue 304 is one of the higher level calculations. By hoisting the evaluation of Hue to the outer consumer context, Hue and all of its subexpressions are cached in the outer context and thereby enable the reuse of a massive number of sub expressions.

In some implementations, aligning consumer contexts with basic blocks greatly improves the number of expressions available for reuse in the cache of a consumer context. Some implementations also determine when to reuse the result of an expression. For example, in FIG. 4E, both CASE statements are evaluated in the same consumer context. When evaluating the second CASE statement, the first CASE statement is already in the expression cache, so it can be reused. However, this expression can be reused only if the equivalence function identifies the two expressions as equivalent. Similarly, the expression a+b is already in the cache of the top-level context, and can be reused when b+a is evaluated in the nested consumer context (as long as the equivalence function recognizes expression commutativity).

Figure 4F:
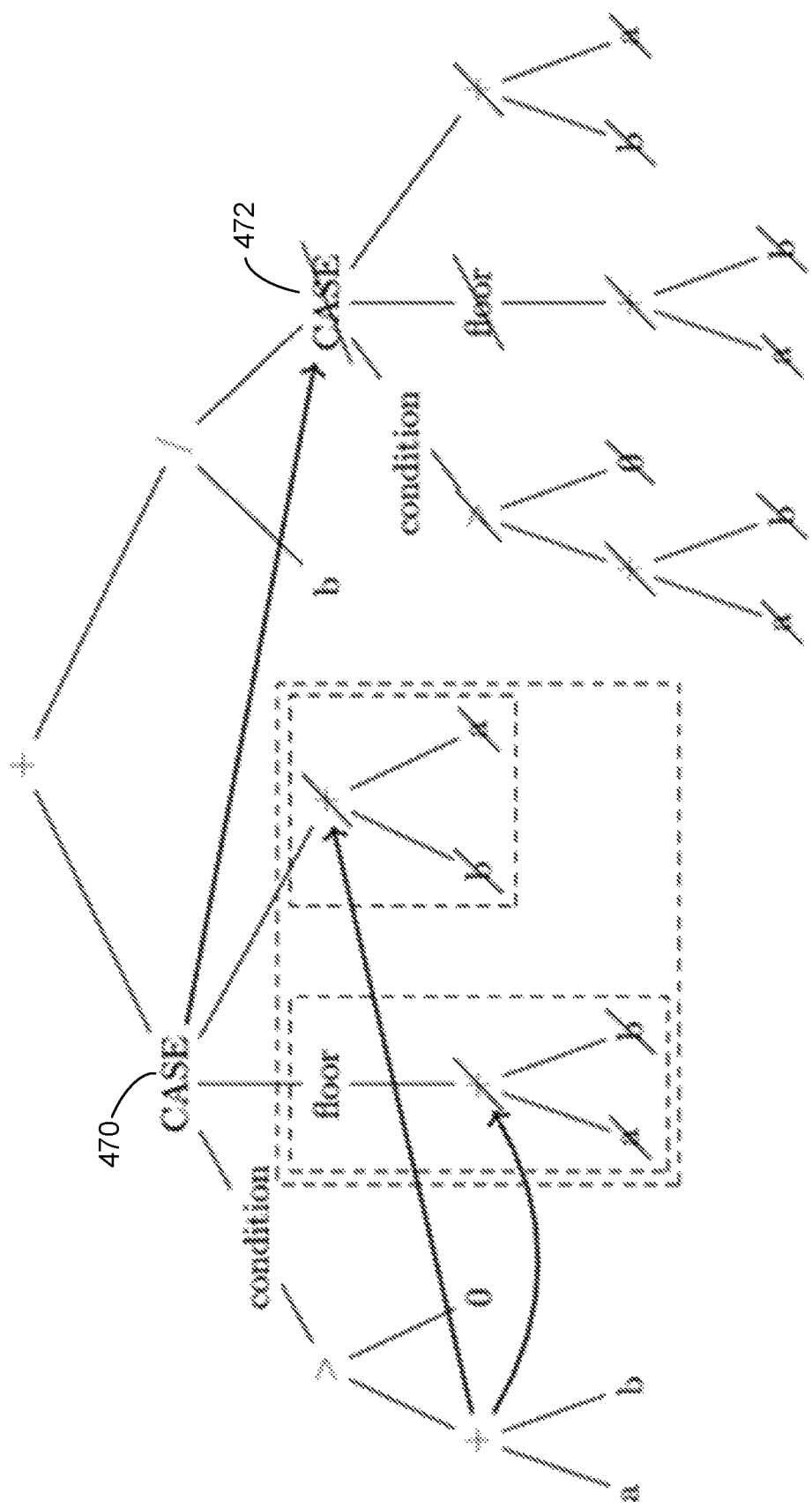
FIG. 4F illustrates an expression tree representation of the expression represented in FIG. 4C after applying an improved equivalence function, in accordance with some implementations.

FIG. 4F illustrates the same expression tree as in FIG. 4D, further optimized with an improved equivalence function. As noted earlier, not all equivalence function recognize n-ary function equivalence.

In some implementations, in order to determine that the subtrees at 470 and 472 are equivalent, the equivalence function needs to handle arbitrary expressions and needs to handle commutativity. In some implementations, in order to handle expressions with an arbitrary number of inputs, the equivalence function compares all inputs for equivalence recursively. In some implementations, the equivalence function contains logic to match inputs of the compared expressions against each other, and is thereby able to exploit commutativity. In some implementations, the equivalence function also supports associativity (e.g., recognizing the equivalence of a+(b+c) and (a+b)+c). In some implementations, the equivalence function uses a hash function that takes commutativity and associativity into account.

In some implementations, the equivalence function and the hash function used during logical optimization of the operator tree are used for consumer context during code generation to improve the quality of the generated code. For example, the generated code may be based on an operator tree optimized for reuse, as illustrated in FIG. 4F. In this example, the database engine generates the code for the whole CASE statement only once. Because of this, the database engine computes the value of the expression (and its subexpressions) only once during query execution. For example, the result of a+b is now reused for b+a.

Some implementations limit the use of the improved equivalence function in the consumer context because it can lead to excessive overhead. For example, a hash function always calculates the hashes for all of the inputs of a given expression recursively. A hash function is used in addition to the equivalence function for the efficient implementation of lookup structures, such as hash maps and hash sets indexed by expression trees. When generating the expression ((a+b)+c)+d, the consumer context would first request the hash for the whole expression. The hash function then recursively calculates the hashes for (a+b)+c and a+b. Next, assuming the consumer context did not find the expression in its cache, the process goes on to generate code for ((a+b)+c)+d. The process checks whether the subexpression (a+b)+c already exists in its cache. For this purpose, the process hashes (a+b)+c, which in turn recalculates the hash for a+b. Assuming that (a+b)+c is a cache miss, the consumer context generates the corresponding code. As part of this, the process checks if a+b was already cached, hashing a+b again.

In this example, the subexpression a+b is hashed three times. For bigger expressions it could easily be hashed much more often. In the worst case, generating an expression tree containing n expressions will call the hash function $O(n^2)$ times. In the best case, the hash function would still be called $O((\log n)^2)$ times.

In some implementations, using $O(n^2)$ algorithms in the database engine is avoided so that operation of the database engine scales smoothly to larger inputs. In some implementations, memorization is used to avoid recomputing hashes for the same expression multiple times.

When a calculation contains sub-calculations as part of the first condition of a conditional expression, the sub-calculations are cached in the outer consumer context as described with reference to FIG. 4E. However, when a sub-calculation appears only in the result values instead of the conditions, the database engine generally cannot eliminate the corresponding duplication. For example, hoisting only the first condition to an outer context can improve execution time significantly. In some implementations, hoisting is applied to even more expressions to further improve performance.

In some implementations, the code generated for the expression shown in FIG. 5 evaluates the expression a/b only once. Because it is part of the first condition, it gets evaluated in the outer consumer context, and the other occurrences of this expression can reuse the cached result from the first evaluation. In contrast, the code for the expression b/c is typically generated 3 times. When a/b>1, the expression b/c will be computed twice during query execution. The branching structure and the way the consumer contexts are nested can limit reuse for this expression.

FIG. 5 illustrates an expression that is susceptible to common subexpression hoisting. In this example, both the redundant computation and generating redundant code can be avoided by hoisting the expression b/c to the outer consumer context. By evaluating it eagerly in the outer consumer context before descending into the evaluation of the individual branches, the result will be cached in the outer context. In this way, the nested contexts can reuse the cached result and all further occurrences of the expression b/c can be eliminated by the existing caching infrastructure of the consumer context. In some instances, hoisting an expression introduces a semantic difference. For example, the expression in FIG. 5 can lead to a "division by zero" error or a "square root of a negative number" error depending on the values of a, b, and c, and hoisting an expression can alter which of the errors is raised first.

In some implementations, the redundant code for the expression 2/a can be eliminated by hoisting it to the outer context. In some instances, hoisting the expression 2/a is not beneficial. Whereas the expression b/c appears in every branch of the overall expression, the expression 2/a is not part of every branch. For some tuples there is no need to compute a value for 2/a at all, so computing it eagerly can be detrimental to performance. Hoisting the expression 2/a can also change the result. When the value of a is 0, computing 2/a will lead to division by zero. On the other hand, an error might not be raised in the absence of hoisting.

In some implementations, it is difficult to determine whether hoisting an expression would be beneficial. In some implementations, the database engine only hoists expressions that will be computed no matter which branch is chosen during query runtime. For the expression in FIG. 5, this means that the database engine hoists the expression b/c but does not hoist the expression 2/a. In some implementations, this optimization is referred to as Common Subexpression Hoisting (CSH).

In some implementations, the database engine identifies expressions that are common to all branches. The process takes an operator tree as input, and computes a set of expressions that should be hoisted from the CASE expressions. In some implementations, additional real-time requirements are added. For example, because each query is compiled once and usually not reused, the time cost to perform the optimizations (e.g., compile time) is weighed against expected query execution time. Some techniques for comparing compile time to estimated computing time are disclosed in U.S. patent application Ser. No. 15/700,023, filed Sep. 8, 2017, entitled "Adaptive Interpretation and Compilation of Database Queries," which is hereby incorporated by reference in its entirety.

When evaluating compile time, there are several factors to consider. First, there is the overhead cost of testing whether common expressions can be eliminated or eliminated by hoisting. Second, there is the overhead of modifying the operator tree. On the other hand, when successful, CSE and CSH reduce the size of the operator tree, and thus reduce the time required to compile the optimized operator tree to machine code. When there is substantial reuse, the time savings for compilation can be large. This is in addition to the time savings of executing the optimized machine code.

To identify which expressions to hoist, some implementations build a set of computed expressions for each branch. In some implementations, the process builds the sets by traversing the whole expression tree and adding each visited expression to the appropriate set. The expressions that are contained in all of the sets are the ones that are evaluated on every branch, so they are hoisted. Some implementations use the hash and equivalence functions described earlier to identify equivalent expressions.

In some implementations, a subexpression known to be executed on every branch of a nested CASE expression can be hoisted to the outer context when it is also executed on all other branches of the outer CASE. Some implementations use the traverseUntilCase( ) function illustrated in FIG. 8A to identify which expressions can be hoisted.

Figure 6A:
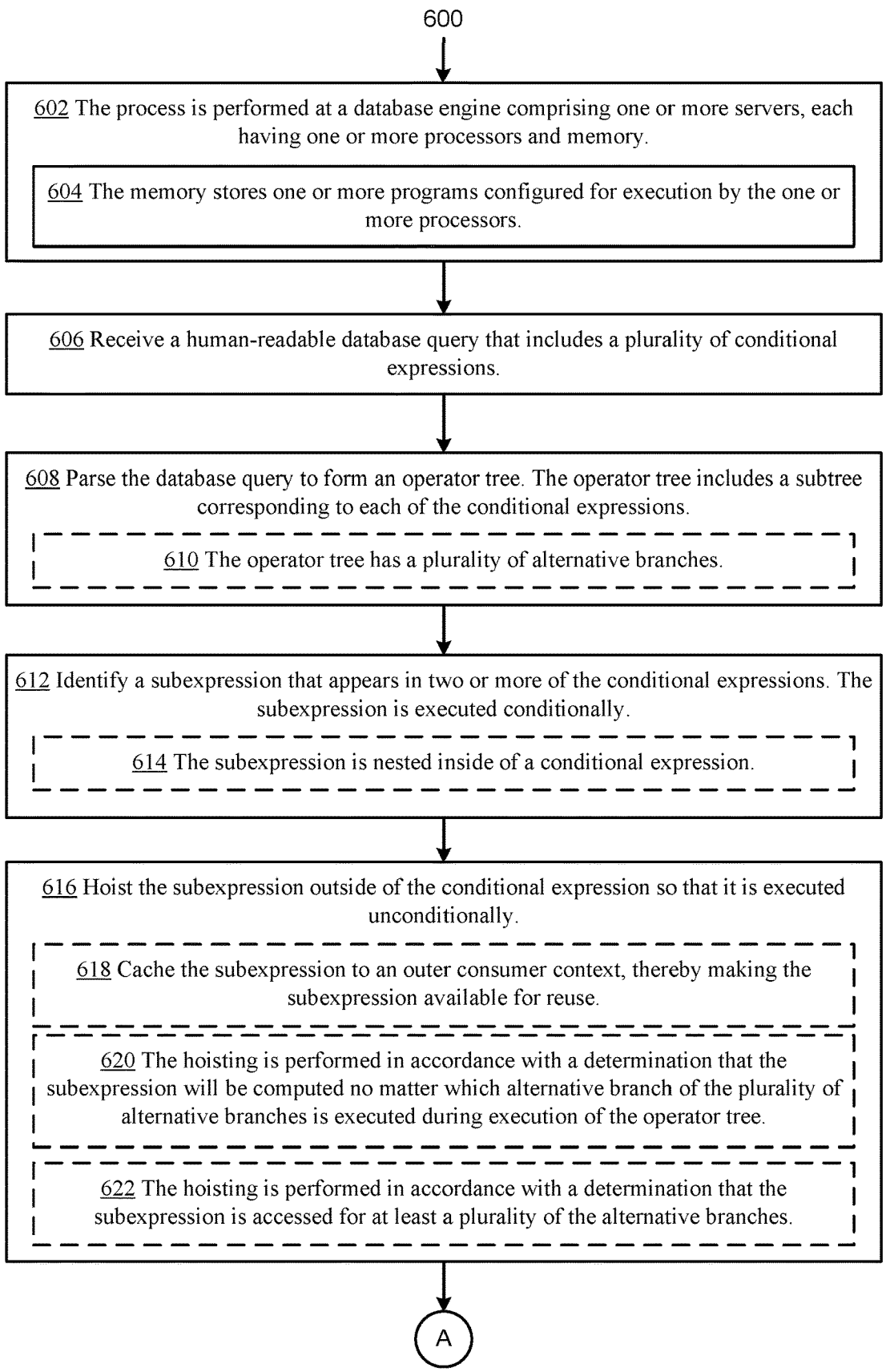
FIGS. 6A-6B provide a flowchart of a process for building and executing a modified operator tree according to some implementations.
Figure 6B:
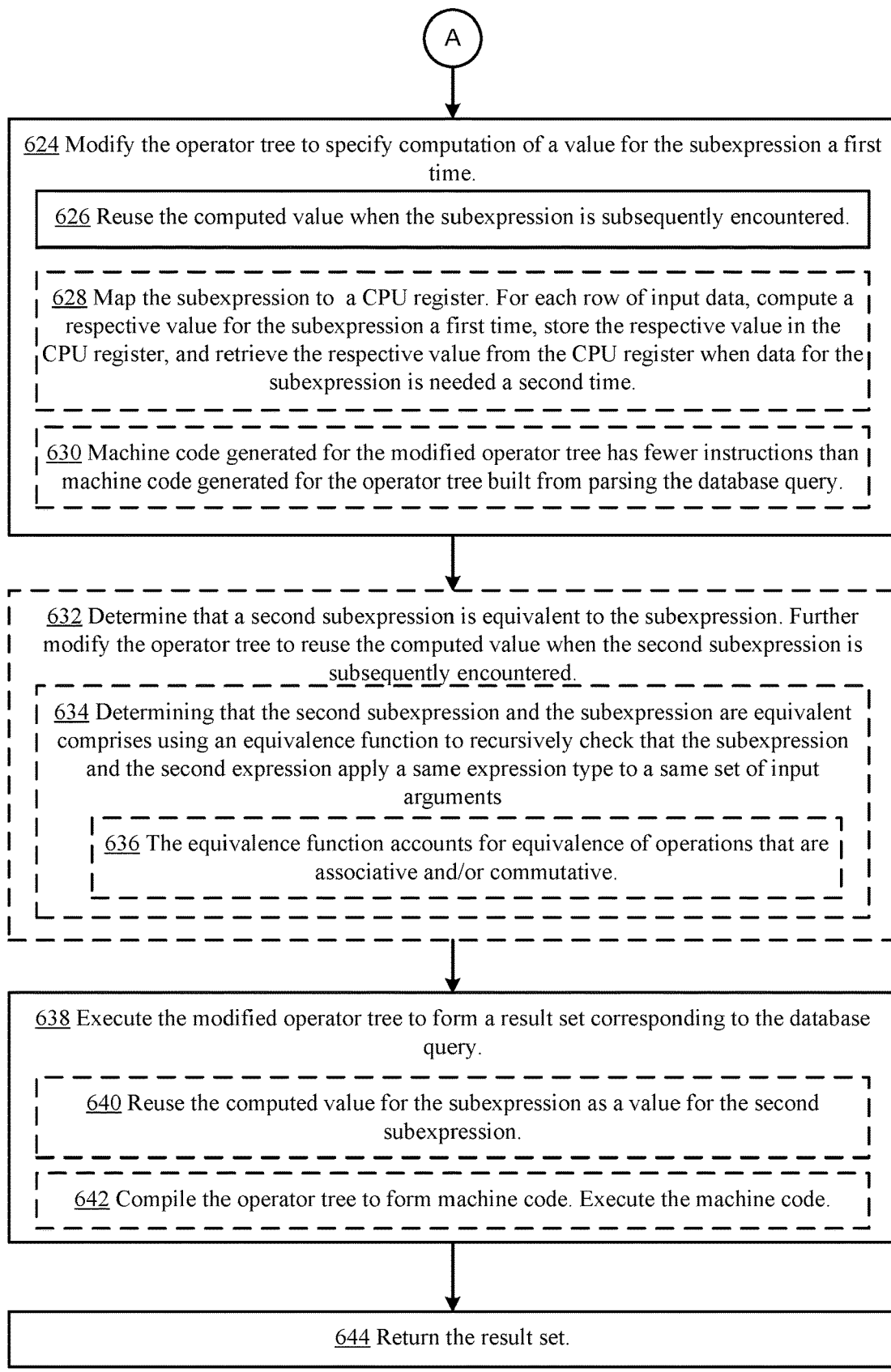

FIGS. 6A and 6B provide a flowchart of a process 600 for retrieving data from a database. The process 600 is performed (602) at a database engine having one or more computing devices, each having one or more processors and memory. The memory stores (604) one or more programs configured for execution by the one or more processors.

The database engine 120 receives (606) a human-readable database query 226, which includes a plurality of conditional expressions. The database engine 120 (or the query parser 240 within the database engine) parses (608) the database query 226 to form an operator tree 228. The operator tree 228 includes a subtree corresponding to each of the conditional expressions. In some instances, the operator tree 228 includes (610) a plurality of alternative branches.

The optimizer 244 identifies (612) a subexpression (e.g., conditional subexpression 246) that appears in two or more of the conditional expressions. The subexpression is executed conditionally. In some instances, the subexpression is nested (614) inside of a conditional expression. In some implementations, the branching structure and the way the consumer contexts are nested does not allow direct reuse of the results. However, the redundant computations can be avoided by hoisting subexpressions to the outer consumer context, as explained with respect to FIG. 5.

The optimizer 244 hoists (616) the subexpression outside of the conditional expression so that it is executed unconditionally. In some implementations, the optimizer caches (618) the subexpression in an outer consumer context, thereby making the subexpression available for reuse. The reuse of more expressions can be enabled by hoisting the first condition of a CASE expression to the outer consumer context as described with respect to FIG. 4E. For example, in FIGS. 3A and 3B caching Hue and all of its subexpressions in the outer context enables the reuse of a large number of subexpressions. In some implementations, the optimizer hoists (620) the subexpression in accordance with a determination that the subexpression will be computed no matter which alternative branch for the plurality of alternative branches is executed during execution of the operator tree, as described with respect to FIG. 5. In some implementations, the optimizer hoists (622) the subexpression in accordance with a determination that the subexpression is accessed for at least a plurality of the alternative branches.

The hoisting forms a modified operator tree. In particular, the optimizer modifies (624) the operator tree to specify computation of a value for the subexpression a first time. This enables the optimizer to reuse (626) the computed value when the subexpression is subsequently encountered.

In some instances, the optimizer maps (628) the subexpression to an LLVM register. In some instances, when the LLVM IR code is compiled, the LLVM register is mapped to a CPU register (e.g., in the CPU(s) 202). For each row of input data, the optimizer computes (628) a respective value for the subexpression a first time, stores (628) the respective value in the CPU register, and retrieves (628) the respective value from the CPU register when data for the subexpression is needed a second time. In some implementations, machine code is generated (630) for the modified operator tree, such that the machine code has fewer instructions (e.g., is more efficient) than machine code generated for the operator tree built from parsing the database query.

In some implementations, the optimizer determines (632) that a second subexpression is equivalent to the subexpression. The optimizer further modifies (632) the operator tree to reuse the computed value when the second subexpression is subsequently encountered. In some implementations, the optimizer uses (634) an equivalence function to recursively check that the subexpression and the second expression apply a same expression type to a same set of input arguments to determine that the second subexpression and the subexpression are equivalent (e.g., in order to check whether two values are equivalent, the ConsumerContext compares expressions using a special equivalence function). In some implementations, the equivalence function accounts (636) for equivalence of operations that are associative and/or commutative (e.g., the equivalence function is able to recognize that the expression a+(b+c) is equivalent to the expression c+(a+b)).

In some implementations, the database engine 120 executes (638) the modified operator tree (e.g., using the query execution module 250) to form a final result set corresponding to the database query 226. In some implementations, the modified operator tree reuses (640) the computed value for the subexpression as a value for the second subexpression. In some implementations, the compiler compiles (642) the operator tree to form machine code and the database engine executes (642) the machine code (e.g., using the query execution module 250). The database engine 120 returns (644) the final result set.

Figure 7:
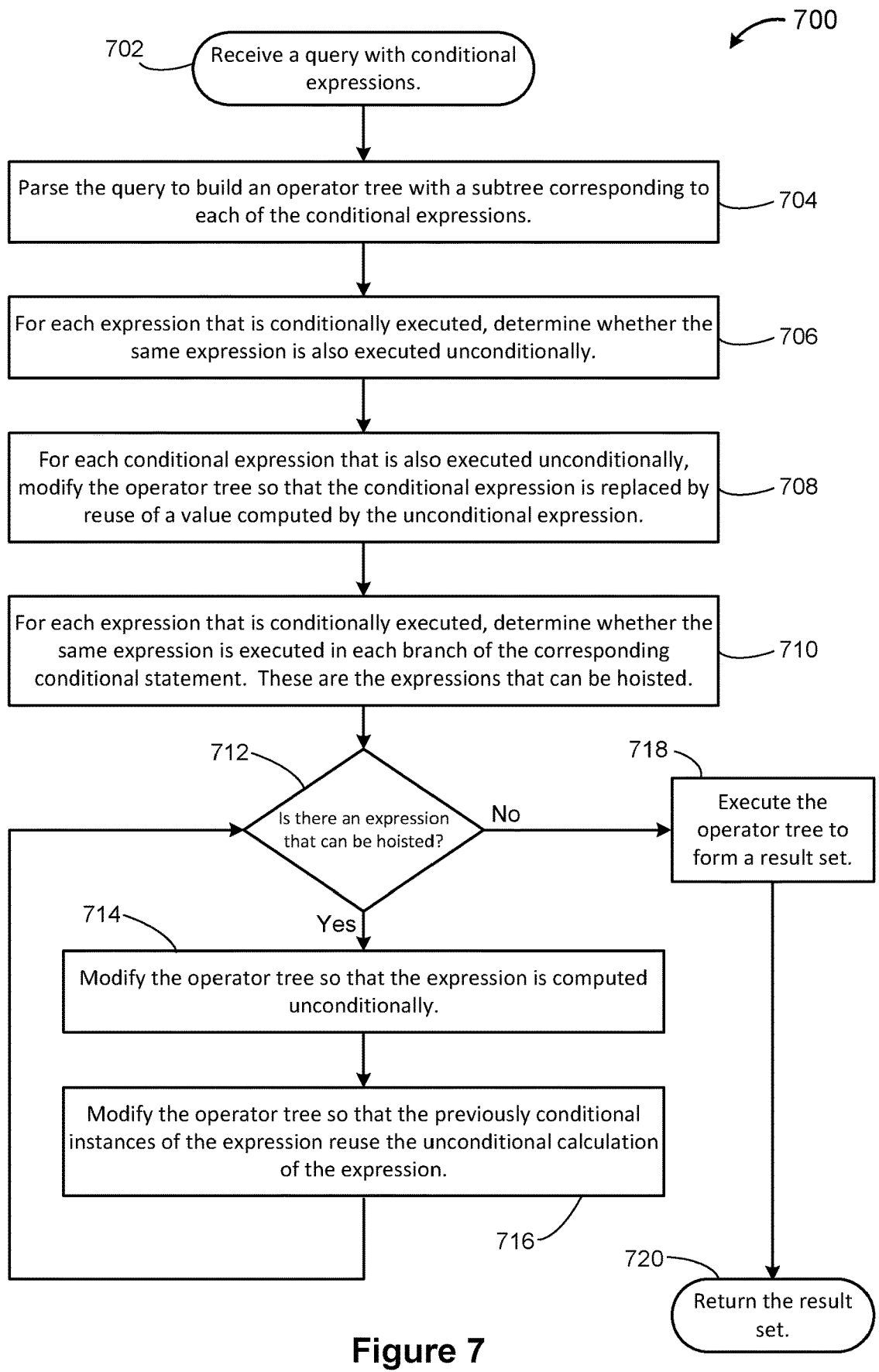
FIG. 7 is a process flow diagram that illustrates a process for modifying an operator tree according to some implementations.

FIG. 7 illustrates a process 700 for building and executing an operator tree 228 for a database query 226 according to some implementations. In some cases, the optimizer 244 modifies the operator tree 228 to improve performance. The process 700 receives (702) a query 226 (e.g., the query shown in FIG. 4A), which may include a conditional expression. The parser 240 parses (704) the query 226 to build an operator tree 228. The operator tree 228 includes a subtree corresponding to each of the conditional expressions.

The process 700 determines (706) whether any of the conditional expressions are also computed unconditionally. If so, the process modifies (708) the operator tree so that each instance of the condition expression reuses the value computed by the corresponding unconditional expression. In some implementations, when the unconditional execution of an expression appears in the operator tree after the conditional execution, the process also modifies the operator tree so that the unconditional execution is performed earlier. In this way, the computed values will actually be in the cache for the subsequent reuse.

The process 700 also determines whether there are any expressions that are candidates for hoisting. In some implementations, the process determines (710), for each conditionally executed expression, whether the same expression (or an equivalent expression) is executed in each branch of the corresponding conditional statement. These are the expressions that can be hoisted.

When there is (712) an expression that can be hoisted, the process modifies (714) the operator tree so that the expression is computed unconditionally outside of the conditional statement in which it appears. The process also modifies the operator tree so that the previously conditional instances of the expression specify reuse of the unconditional calculation. There may be more than one distinct expression that can be hoisted, so these steps are repeated.

When there are no more expressions to be hoisted, the process proceeds to execute (718) the operator tree to form the requested result set and return (720) the result set to the requester.

The final steps in FIG. 7 have been simplified to specify executing the operator tree 228, but the process is typically more complex. Specifically, the compiler 242 compiles the operator tree 228 (whether modified or not) into executable machine code 230, and the query execution module 250 executes that machine code 230. Executing the machine code 230 builds the result set, and the database engine 120 returns the result set to the client that initiated the query. The "client" may be an application running on the same computing device 200 as the database engine 120 or on a remote computing device 200. In some implementations, the optimizer 244 evaluates other optimization strategies as well before executing the operator tree.

FIGS. 8A, 8B, and 8C provide pseudocode for the functions used in some implementations to identify expressions for hoisting and to implement the hoisting in the operator tree. The traverseUntilCase( ) function in FIG. 8A implements a depth-first pre-order traversal of the operator tree. Depending on the type of the visited node, the routine calls either the function caseCallback( ) or the function otherCallback( ) before descending into the children. The callbacks receive the current node as a parameter. By returning False, the callbacks can stop the traversal and prune parts of the tree traversal. When the callback returns True, the function calls itself recursively. For CASE expressions, only the first condition is traversed. For all other expression types, the function descends into all child expressions. FIG. 8B shows an example of the hoistFromCase( ) function used for common subexpression hoisting.

As shown in FIG. 8A, the traverseUntilCase( ) function is used for common subexpression hoisting using a depth first pre-order traversal without descending into CASE expressions (other than the first condition).

In some implementations, the function hoistFromCase( ) in FIG. 8B identifies the expressions that should be hoisted. For a CASE expression, the function first retrieves a list containing all branches (line 5). The function getBranches( ) returns all result expressions of a CASE expression. In some implementations, the function getBranches( ) ignores the corresponding conditions.

In some implementations, the function hoistFromCase( ) builds the sets of evaluated expressions for all but the last branch (lines 6 to 15). The function hoistFromCase( ) calls the function traverseUntilCase( ) for each branch with callback functions, which insert the expression into the corresponding set. Because the function traverseUntilCase( ) does not expand CASE expressions, those CASE expressions are added to a FIFO queue to be remembered for later processing. This queue contains each not-yet-expanded CASE expressions together with a branch identifier that identifies the branch on which it occurs.

In some implementations, the last branch of a CASE statement is treated differently. By the time the process reaches the last branch, the sets for all other branches are already populated. In some implementations, all other sets are immediately probed for the current expression (line 18). If each of them contains the current expression, the process adds the expression to the hoist list H[caseExpr]. This is the set of expressions to be hoisted for the expression from which hoistFromCases( ) was invoked. In some implementations, the traversal of the expression tree is pruned when an expression is hoisted. For example, the callbacks return False in this case (lines 28 and 32). By doing so, the database engine only hoists maximal subexpressions. (For example, in FIG. 4C, the expression "CASE WHEN (a+b)>0 THEN floor(a+b) ELSE b+a END" is a maximal expression for hoisting, which is more efficient than hoisting smaller subparts of this expression.) The function traverseUntilCase( ) implements a pre-order traversal and the tree is visited top-down. In this way, the database engine first tries to hoist the parent expression before trying to hoist its child expressions. This logic is factored out into the lambda functions hoist( ) and hoistFromTree( ) because it will be reused by the following step.

In some implementations, after processing all of the branches, the process revisits the nested CASE expressions. The process loops over the unexpandedCases (line 39) while skipping all expressions that are already marked as hoisted from the current caseExpr (line 40). Hoisted CASE expressions are expanded by the caller. In some implementations, the database engine avoids processing equivalent expressions multiple times. For example, for each not-yet hoisted CASE expression, the database engine calls the function hoistFromCase( ) recursively. This call will populate the hoist list H[expr] with expressions hoisted from the nested CASE. In some implementations, all of those expressions are guaranteed to be computed for the nested CASE expression. Because of this, the expressions are added to the set of computed expressions for this branch by calling the function hoistFromTree( ) (line 43). The function hoistFromTree( ) immediately checks whether the newly added expressions enable hoisting more expressions from the current context. In addition, the function hoistFromTree( ) adds CASE expressions hoisted from the nested CASE to the unexpanded Cases queue. This ensures that all hoisted CASE expressions are handled correctly.

In some implementations, the unexpandedCases queue is not a FIFO queue. For example, the unexpandedCases queue is a priority queue in some implementations. In some implementations, the order of the elements in the unexpandedCases queue determines the order in which nested CASE expressions are expanded. By choosing a FIFO queue, nested CASE expressions are processed in a breadth-first fashion. Consider a top-level CASE expression with a nested CASE expression. Using a FIFO queue, all expressions included directly in the top-level CASE expression are evaluated first. Only afterwards are the expressions for the nested CASE expression evaluated. When there are more than two levels of nesting, the same methodology applies. That is, all expressions that are at a nesting depth of 2 are processed before beginning the processing of the expressions having a nesting depth of 3 (and so on). In some implementations, a FIFO queue is optimal when equivalent expressions appear on the same or a similar nesting depth.

FIG. 8C provides pseudocode for a markHoisted( ) function that is used for common subexpression hoisting in some implementations. In some implementations, the function hoistFromCase( ) needs to be called for a CASE expression. In some implementations, in order to apply Common Subexpression Hoisting for arbitrary expressions, the database engine finds all CASE expressions and applies the function markHoisted( ). The markHoisted( ) function reuses the function traverseUntilCase( ) with appropriate callbacks. Because the callbacks always return True, the traversal is never pruned. For each encountered CASE expression, the database engine calls the function hoistFromCase( ). In some implementations, all expressions hoisted from within a CASE expression were not yet visited by the process, and they may still contain nested CASE expressions. To handle these additional expressions, the function markHoisted( ) is called for each expression hoisted from the inner CASE expression.

Figure 10A:
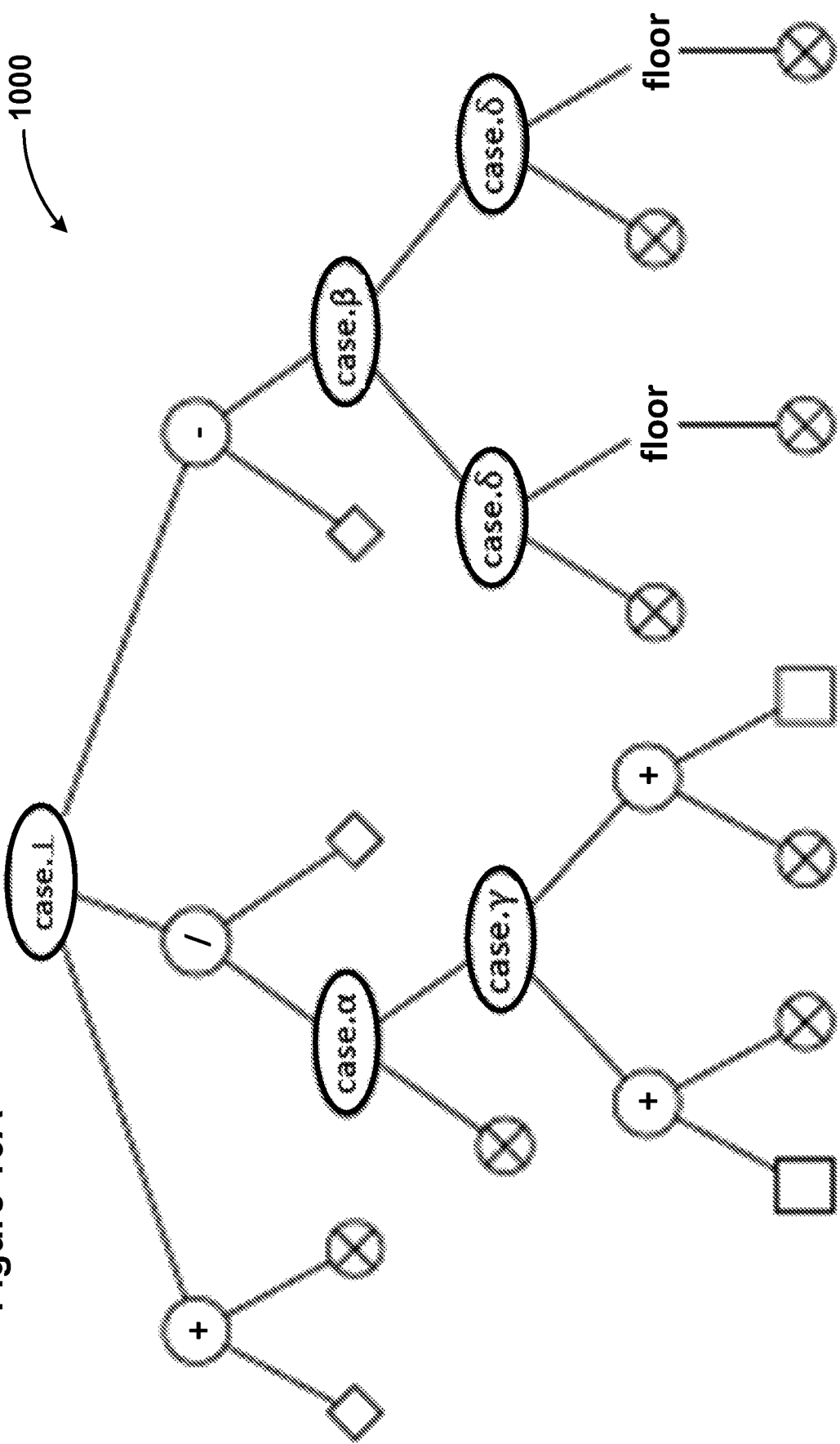
FIGS. 10A-10C illustrate applying subexpression hoisting to an expression tree according to some implementations.

FIG. 10A provides a sample expression tree 1000. This expression tree contains 3 different basic expressions represented by the symbols ◇, ⊗, and □. Those symbols can be thought of as placeholders for other arbitrarily complex sub-expressions. In this example CSH will not descend into them. If these expressions were replaced by more complex expressions, CSH would descend into them. The expression tree consists of basic algebraic operators intermixed with CASE expressions, which are labeled as case.⊥ (for the root), case.α, case.β, case.γ, and case.δ. For the algebraic operators all inputs are shown. For the CASE expressions, only the result values of the different branches are shown. The corresponding conditions are not depicted.

Common subexpression hoisting starts by calling the function markHoisted( ) at the root node case.⊥. The function markHoisted( ) searches for nested CASE expressions. The markHoisted( ) function identifies the top-level expression as a CASE expression and calls the function hoistFromCase( ) from the case.⊥ node.

Figure 10B:
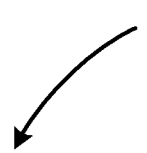

The function hoistFromCase( ) does the majority of the work and identifies all of the hoisted expressions. FIGS. 9A and 9B show its execution trace for this process. In particular, FIGS. 9A and 9B depict the state of the exprByBranch hash map and the unexpandedCases queue just before and after the recursion from line 41 in FIG. 8B. The expression sets stored in the exprByBranch hash map are depicted by columns of expressions divided using vertical separator lines. Although the sets are unordered in some implementations, FIGS. 9A and 9B show the contained expressions ordered by insertion time. Directly below the depiction of the exprByBranch hash map, the content of the unexpandedCases queue is depicted. The first part of each entry (i.e., the branch on which the expression occurred) is represented by the corresponding 1-based branch number. The second part (i.e., the not-yet-expanded CASE expression) is depicted using the corresponding symbol from the map 1002 shown in FIG. 10B.

The first step shown in FIG. 9A corresponds to the call hoistFromCase(case.⊥) made by the function markHoisted( ). When hoistFromCase(case.⊥) is called, this function first creates 3 expression sets, one for each branch of case.⊥. The function fills the first two sets with all expressions contained in the respective branches (lines 6 to 15 from FIG. 8B). Note how the CASE expressions are inserted into the sets but not expanded. Execution of line 37 (see FIG. 8B) then traverses the last branch and fills the third expression set. During the traversal, the function identifies all expressions that are common to all branches using containment checks on the other sets. In this instance, the expression ◇ is contained in all of the sets and can be hoisted. To remember this hoisted expression, it is added to the set of hoisted expressions H[case⊥] (see line 19 of FIG. 8B).

After finishing the execution of line 37, the queue contains all CASE expressions that were encountered while building the expression sets. The hoistFromCase( ) function now calls itself recursively on each entry of the queue (lines 39, 41). The function first descends into case.α. In FIG. 9A this recursive call is represented by the bubble 902. First, hoistFromCase(case.α) builds the expression sets for each branch. This time, no expressions are common to all branches exist and nothing can be hoisted. Notice that the nested expression case.γ is still unexpanded.

For this nested case expression the function hoistFromCase( ) is called a second time recursively. In FIG. 9A, this call is depicted by the bubble 900. Because the equivalence function is aware of commutativity, the function identifies □ +⊗ as a hoistable expression. The subexpressions of this expression are not added to the last branch because the traversal is pruned after hoisting □ +⊗. This is achieved by line 28 of FIG. 8B. Since there were no nested case expressions, the unexpandedCases queue is empty and the recursive call returns.

Back at recursion depth one, the algorithm now adds all hoisted expressions to the expression set for the corresponding branch using the second branch (line 43). Because the expression □ +⊗ was hoisted from its child, the function is now able to hoist ⊗. After doing so, all entries from the queue are processed and the recursive call returns.

The top-level call to the function hoistFromCase( ) adds the hoisted expression ⊗ to the set for the second branch. The function checks whether ⊗ is guaranteed to be executed on all branches now. In this instance, the third branch does not contain the expression ⊗, so nothing is hoisted. Note that the function checks only whether the newly added expressions can be hoisted. The function does not redo the check for all expressions contained in the expression sets.

FIGS. 9A and 9B illustrate a trace showing the states and recursion levels of the extractFromCase( ) function. Having finished the recursive call for case.α, the queue still contains the expression case.β. The resulting invocation of extractFromCase(case.β) identifies that the whole CASE expression case.δ is common among all branches. Although the expression case.δ is part of the queue, it is not processed yet. It was hoisted, and line 40 from FIG. 8B skips all hoisted expressions while processing the queue.

The modified expression tree 1004 illustrates the changes to the original expression tree 1000 after applying common subexpression hoisting. The invoking function hoistFromCase( ) picks up the hoisted expression case.δ and adds it to the corresponding third branch. In addition, the function hoistFromTreeLambda( ) (invoked from line 43) adds this hoisted CASE expression to the queue. Because the queue is otherwise empty, case.δ is expanded immediately by the top-level call to hoistFromCase( ).

The recursive call hoists the expression ⊗ because it appears on all of the branches. After adding this newly hoisted expression, the process is now able to hoist the expression ⊗ further to the top-level node for the expression case.⊥. The queue is now empty and the call returns.

The initial call to markHoisted( ) now picks up the expressions hoisted from the expression case.⊥, (i.e., ◊ and ⊗), and calls the function markHoisted( ) for them recursively. If these had been more complex expressions, it would be possible to hoist additional expressions from them. After returning from the top-level call to markHoisted( ) the shared table H contains the entries as shown in the map 1002 in FIG. 10.

During LLVM IR code generation, the map 1002 is used in order to pre-evaluate expressions before evaluating the actual expressions. For example, when the compiler is about to generate the code for the expression case.⊥, the compiler first generates the code for the expressions ◊ and ⊗, and generates code to cache their results in the consumer context. During code generation for the expression case.⊥, those cached results are then available for reuse. In this way, all 11 nested occurrences of ◊ and ⊗ can be eliminated. Similarly, both occurrences of the expression case.δ can be eliminated by evaluating and caching the result before evaluating the expression case.β.

Figure 10C:
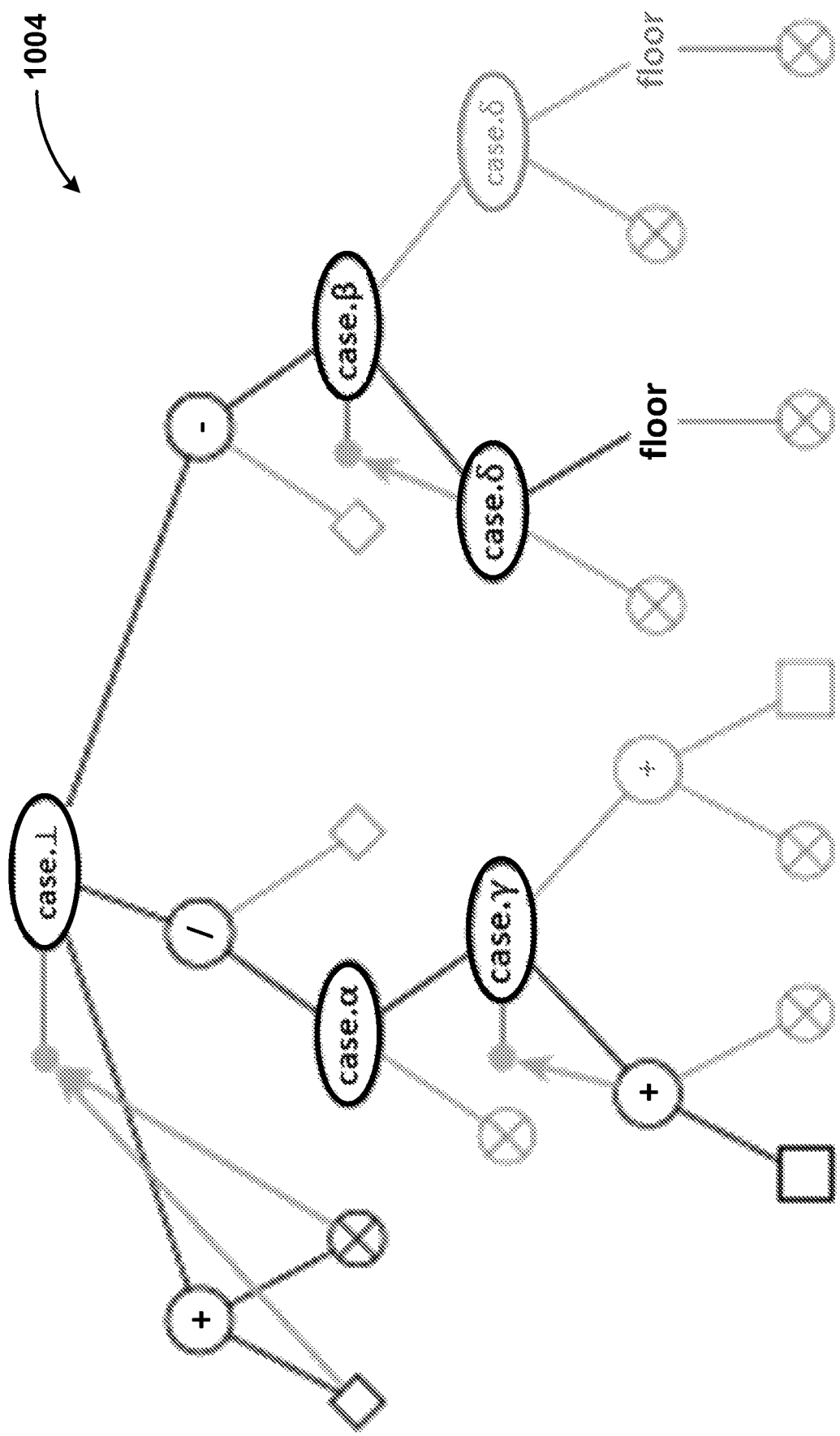

The optimized expression tree 1004 generated based on the computed hoisting information is depicted in FIG. 10C. The arrows in the tree 1004 indicate hoisted expressions and where they are now being evaluated. The parts of the expression tree that are able to reuse cached results are faded to gray in the modified expression tree 1004. For those parts, no code needs to be generated. After applying CSH, only 13 of the initial 26 expression nodes need to have code generated. The smaller expression tree reduces compile time, reduces code size, and reduces query execution time (because equivalent expressions don't need to be evaluated multiple times).

In some implementations, CSH has a limited effect on compilation time. In some implementations, CSH reduces the time spent in LLVM for machine code optimization significantly. For example, the number of instructions may be reduced by more than half. The same thing happens to the number of generated basic blocks. In some implementations, CSH is not able to remove any of the CASE branches. In some implementations, CSH only removes divisions. However, each division also generates a corresponding basic block because SQL semantics require checking if the divisor is 0. The corresponding branch is responsible for generating two new basic blocks. By executing the division only once, the database engine must only check for 0 once and does not need to generate the corresponding basic blocks multiple times.

In some implementations, the caching provided by consumer contexts depends on the order in which expressions are compiled. For example, consider the query "SELECT CASE a>0 THEN a/b END, a/b FROM table1", which has two instances of the expression a/b. If executed in the natural order, the database engine is not able to reuse the result of the first instance because the first instance is conditional. (If the user switched the order of the selected expressions, the database engine would be able to reuse the result because the expression a/b would be computed unconditionally first.) Some implementations identify circumstances where an expression is repeated and an unconditional instance of the expression appears later in the expression tree. These implementations can move the unconditional calculation forward in the execution process, and reuse the calculation wherever it appears in the expression tree. In general, some implementations evaluate reordering options whenever there are multiple instances of the same expression.

Some implementations fully exploit associativity and commutativity for eliminating common subexpression. For example, the database engine may be able to identify that a+(b+c) is equivalent to c+(b+a), and may identify the common expression (a+b) within the expressions (a+2)+b and (a+1)+b. Some implementations impose some limits on identifying equivalent expressions based on associativity and commutativity because the overhead for checking all variations may be too high. In many instances, duplication of expressions occurs because the queries are software generated, as illustrated in FIGS. 3A-3C. In this scenario, the software generating the query is likely to generate the equivalent expressions in the same way each time, so applying associativity and/or commutativity rules does not yield many new reusable expressions.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A database engine, comprising:
one or more computing devices, each having one or more processors and memory, wherein the memory stores one or more programs configured for execution by the one or more processors, the one or more programs comprising instructions for:
receiving a human-readable database query that includes a plurality of conditional expressions;
parsing the database query to build an operator tree that includes a subtree corresponding to each of the conditional expressions;
identifying a subexpression that appears in two or more of the conditional expressions, wherein the subexpression is executed conditionally;
hoisting the subexpression outside of the two or more conditional expressions so that it is executed unconditionally;
modifying the operator tree to specify computation of a value for the subexpression a first time and to reuse the computed value when the subexpression is subsequently encountered;
executing the modified operator tree to form a result set corresponding to the database query, thereby evaluating the subexpression only a single time for each row of input data; and
returning the result set.

2. The database engine of claim 1, further comprising:
mapping the subexpression to a register; and
for each row of input data:
computing a respective value for the subexpression a first time;
storing the respective value in the register; and
retrieving the respective value from the register when data for the subexpression is needed a second time.

3. The database engine of claim 1, further comprising:
determining that a second subexpression is equivalent to the subexpression; and
further modifying the operator tree to reuse the computed value when the second subexpression is subsequently encountered;
wherein executing the modified operator tree comprises reusing the computed value for the subexpression as a value for the second subexpression.

4. The database engine of claim 3, wherein determining that the second subexpression and the subexpression are equivalent comprises using an equivalence function to recursively check that the subexpression and the second expression apply a same expression type to a same set of input arguments.

5. The database engine of claim 4, wherein the equivalence function accounts for equivalence of operations that are associative and/or commutative.

6. The database engine of claim 1, wherein the subexpression is nested inside of a conditional expression.

7. The database engine of claim 1, wherein hoisting the subexpression outside of the conditional expression comprises caching the subexpression to an outer consumer context, thereby making the subexpression available for reuse.

8. The database engine of claim 1, wherein:
the operator tree has a plurality of alternative branches; and
the hoisting is performed in accordance with a determination that the subexpression will be computed no matter which alternative branch of the plurality of alternative branches is executed during execution of the operator tree.

9. The database engine of claim 1, wherein:
the operator tree has a plurality of alternative branches; and
the hoisting is performed in accordance with a determination that the subexpression is accessed for at least a plurality of the alternative branches.

10. The database engine of claim 1, wherein executing the operator tree comprises compiling the operator tree to form machine code and executing the machine code.

11. The database engine of claim 1, wherein machine code generated for the modified operator tree has fewer instructions than machine code generated for the operator tree built from parsing the database query.

12. A method of retrieving data from a database, comprising:
at a computer system having one or more computing devices, each computing device having one or more processors and memory storing one or more programs configured for execution by the one or more processors:
receiving a human-readable database query that includes a plurality of conditional expressions;
parsing the database query to build an operator tree that includes a subtree corresponding to each of the conditional expressions;
identifying a subexpression that appears in two or more of the conditional expressions, wherein the subexpression is executed conditionally;
hoisting the subexpression outside of the two or more conditional expressions so that it is executed unconditionally;
modifying the operator tree to specify computation of a value for the subexpression a first time and to reuse the computed value when the subexpression is subsequently encountered;
executing the modified operator tree to form a result set corresponding to the database query, thereby evaluating the subexpression only a single time for each row of input data; and
returning the result set.

13. The method of claim 12, further comprising:
mapping the subexpression to a register; and
for each row of input data:
computing a respective value for the subexpression a first time;
storing the respective value in the register; and
retrieving the respective value from the register when data for the subexpression is needed a second time.

14. The method of claim 12, further comprising:
determining that a second subexpression is equivalent to the subexpression; and
further modifying the operator tree to reuse the computed value when the second subexpression is subsequently encountered;

wherein executing the modified operator tree comprises reusing the computed value for the subexpression as a value for the second subexpression.

15. The method of claim 14, wherein determining that the second subexpression and the subexpression are equivalent comprises using an equivalence function to recursively check that the subexpression and the second expression apply a same expression type to a same set of input arguments.

16. The method of claim 15, wherein the equivalence function accounts for equivalence of operations that are associative and/or commutative.

17. The method of claim 12, wherein:
the operator tree has a plurality of alternative branches; and
the hoisting is performed in accordance with a determination that the subexpression will be computed no matter which alternative branch of the plurality of branches is executed during execution of the operator tree.

18. The method of claim 12, wherein:
the operator tree has a plurality of alternative branches; and
the hoisting is performed in accordance with a determination that the subexpression is accessed for at least a plurality of the alternative branches.

19. The method of claim 12, wherein executing the operator tree comprises compiling the operator tree to form machine code and executing the machine code.

20. A non-transitory computer readable storage medium storing one or more programs configured for execution by a computer system having one or more processors and memory, the one or more programs comprising instructions for:
receiving a human-readable database query that includes a plurality of conditional expressions;
parsing the database query to build an operator tree that includes a subtree corresponding to each of the conditional expressions;
identifying a subexpression that appears in two or more of the conditional expressions, wherein the subexpression is executed conditionally;
hoisting the subexpression outside of the two or more conditional expressions so that it is executed unconditionally;
modifying the operator tree to specify computation of a value for the subexpression a first time and to reuse the computed value when the subexpression is subsequently encountered;
executing the modified operator tree to form a result set corresponding to the database query, thereby evaluating the subexpression only a single time for each row of input data; and
returning the result set.

* * * * *